US009594397B2

(12) United States Patent
Kiyamura et al.

(10) Patent No.: US 9,594,397 B2
(45) Date of Patent: Mar. 14, 2017

(54) DISPLAY APPARATUS

(71) Applicant: CANON KABUSHIKI KAISHA, Tokyo (JP)

(72) Inventors: Kousuke Kiyamura, Kawasaki (JP); Takumi Yamanaka, Tokyo (JP); Shunsuke Ninomiya, Fujisawa (JP); Fumihiro Kajimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/060,369

(22) Filed: Mar. 3, 2016

(65) Prior Publication Data
US 2016/0262278 A1 Sep. 8, 2016

(30) Foreign Application Priority Data

Mar. 6, 2015 (JP) ................................. 2015-045141

(51) Int. Cl.
G06F 1/16 (2006.01)
(52) U.S. Cl.
CPC ....................................... G06F 1/16 (2013.01)
(58) Field of Classification Search
CPC .............................. G06F 1/1647; G06F 1/1649
See application file for complete search history.

(56) References Cited

U.S. PATENT DOCUMENTS

| 6,343,006 | B1* | 1/2002 | Moscovitch | B60R 11/02 |
| | | | | 348/794 |
| 8,539,705 | B2* | 9/2013 | Bullister | G06F 1/1615 |
| | | | | 345/1.1 |
| 9,030,812 | B2* | 5/2015 | Nakamura | G06F 1/1624 |
| | | | | 345/1.1 |
| 2015/0131217 | A1* | 5/2015 | Brandt | F16M 11/18 |
| | | | | 361/679.04 |
| 2015/0138703 | A1* | 5/2015 | Gillis | G06F 1/1626 |
| | | | | 361/679.04 |

FOREIGN PATENT DOCUMENTS

JP 2010-266752 A 11/2010

* cited by examiner

*Primary Examiner* — Anthony Q Edwards
(74) *Attorney, Agent, or Firm* — Canon USA, Inc., IP Division

(57) ABSTRACT

A display apparatus includes panels, and a connection member that connects the panels. Relative positions of the panels can be changed to a first state, a second state, and a third state. The connection member includes end portions and a connection region between the end portions. The connection region is superimposed on a different one of the panels in the first state and the second state.

14 Claims, 20 Drawing Sheets

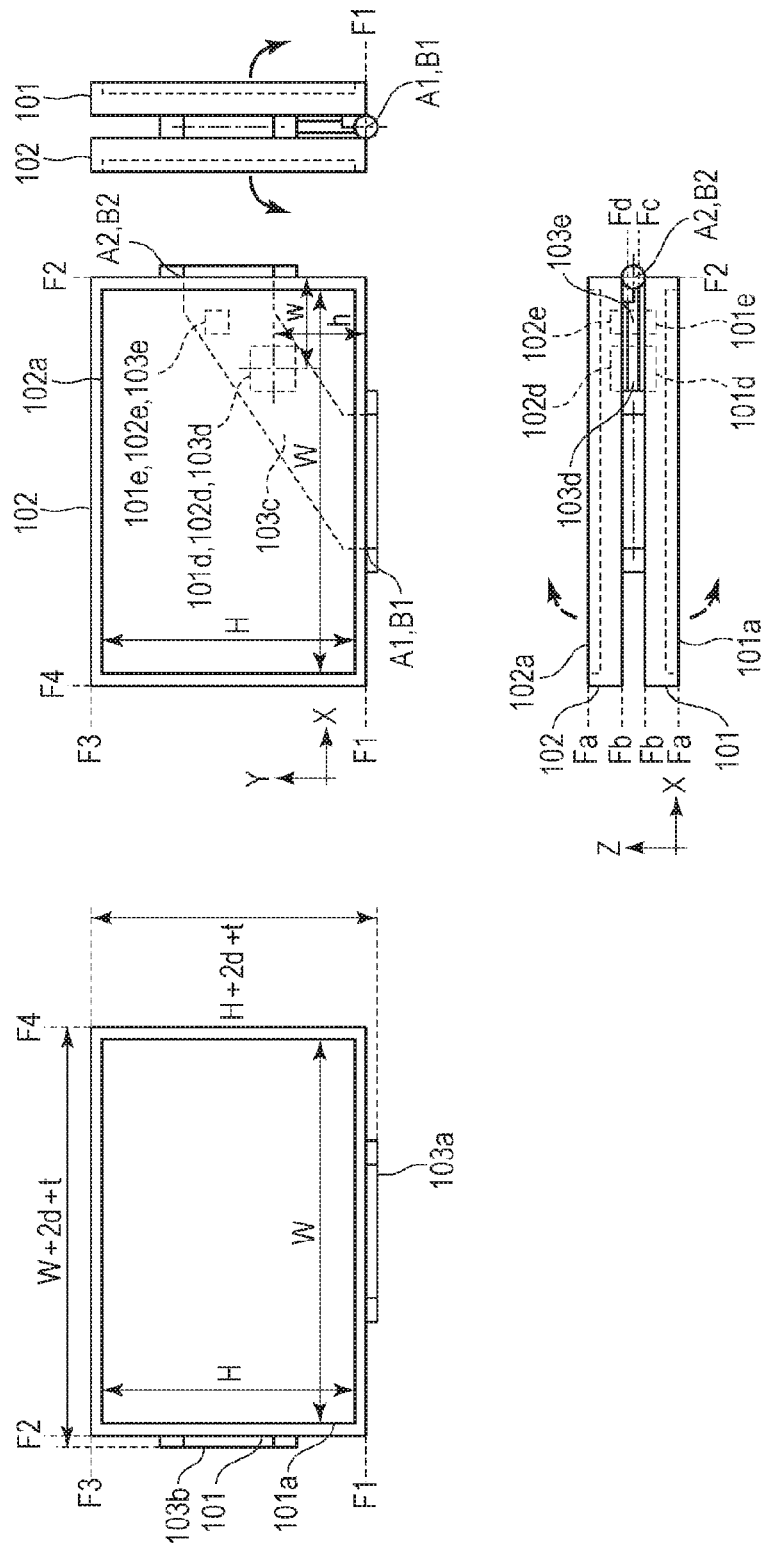

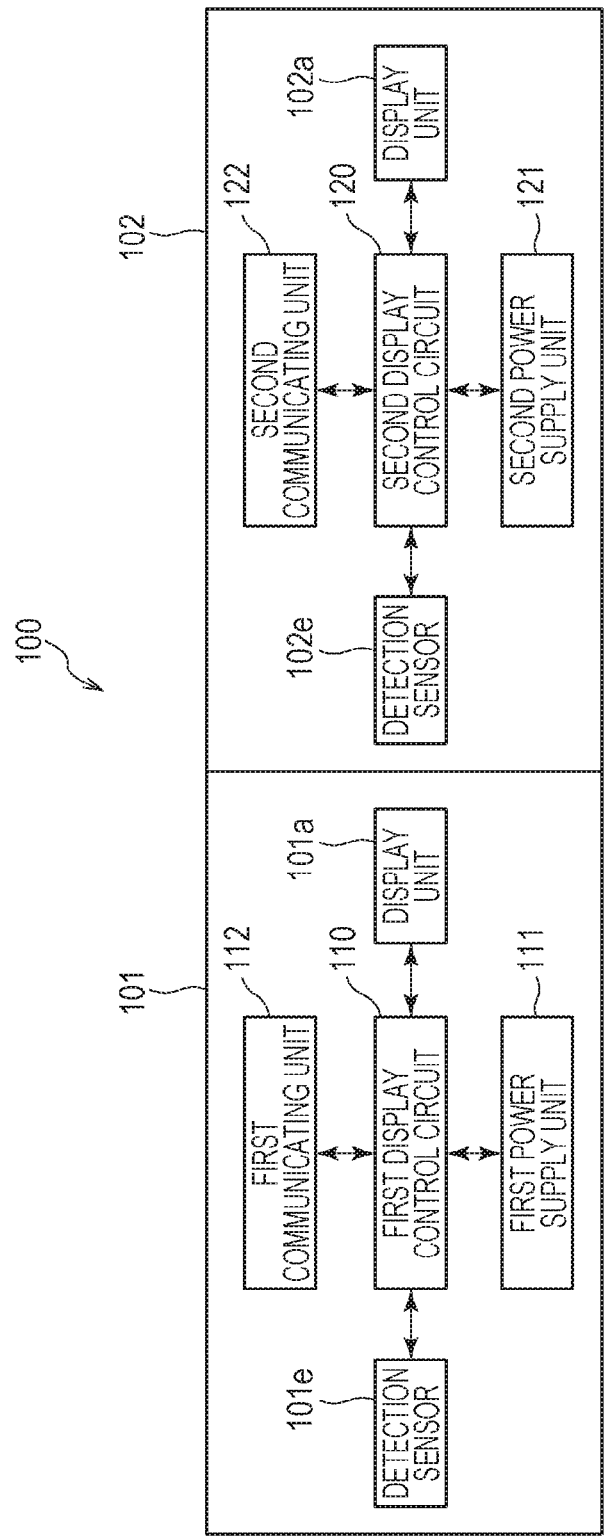

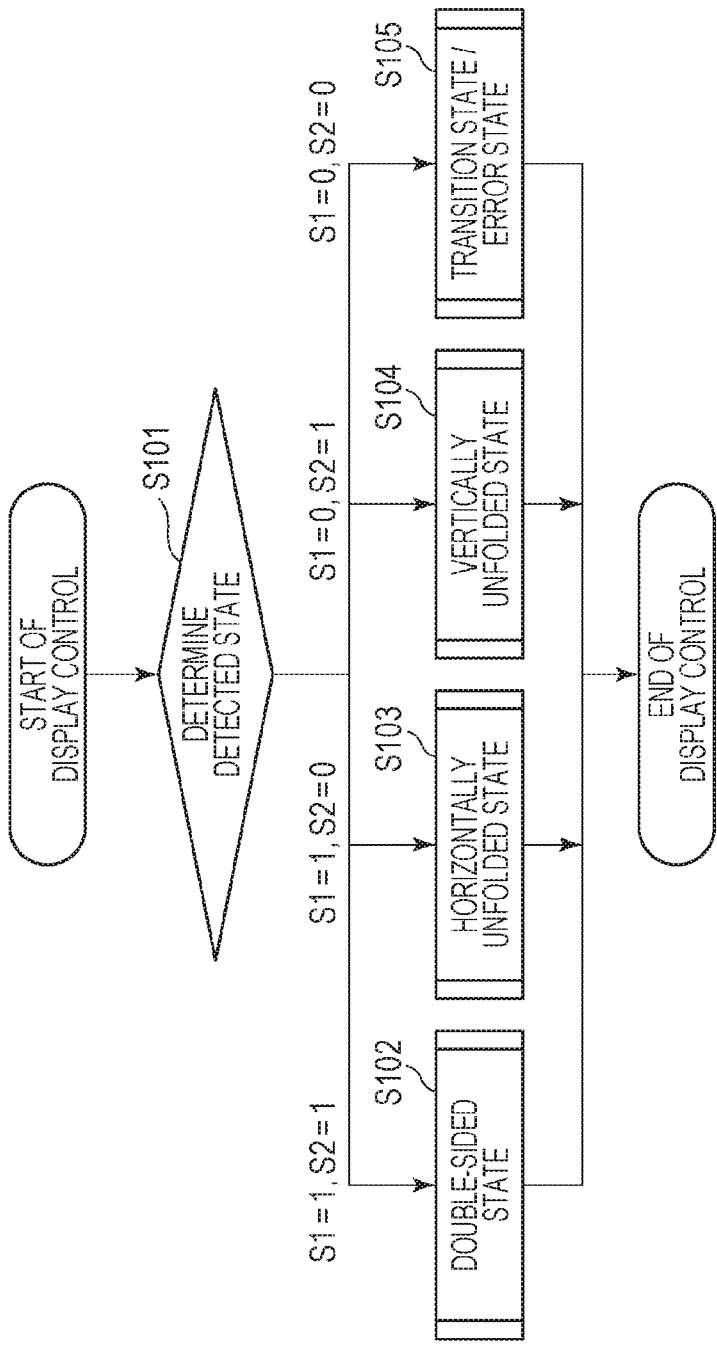

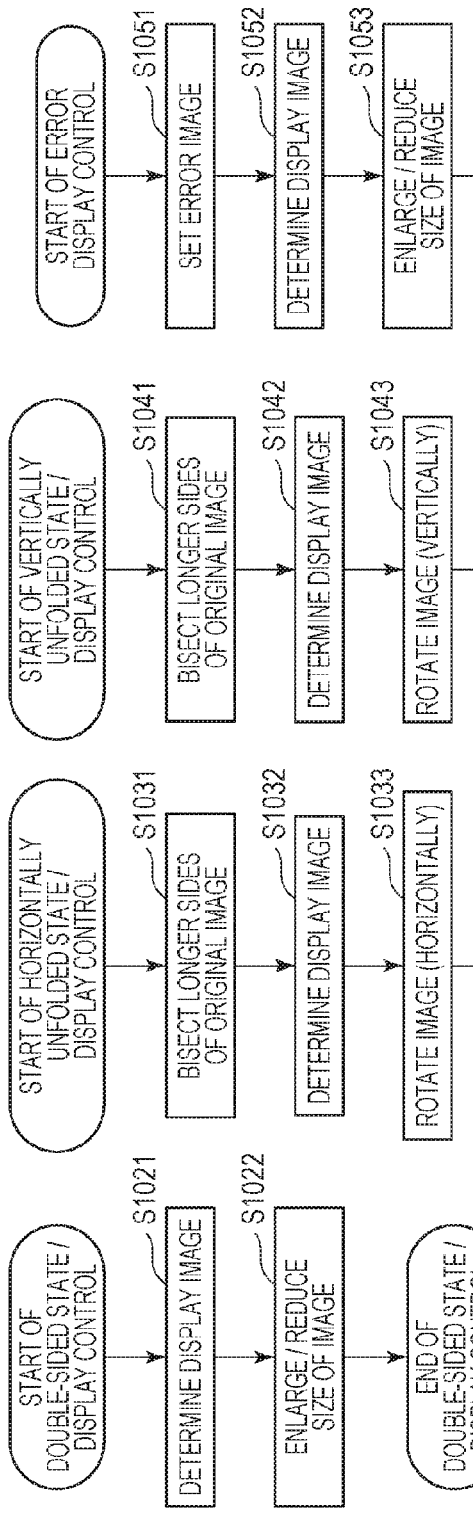

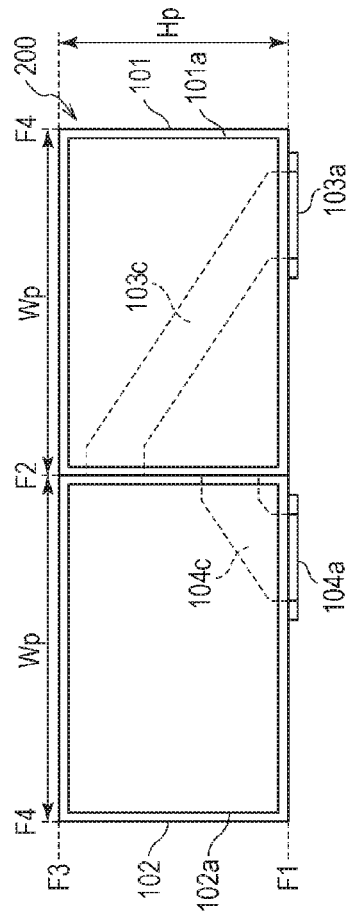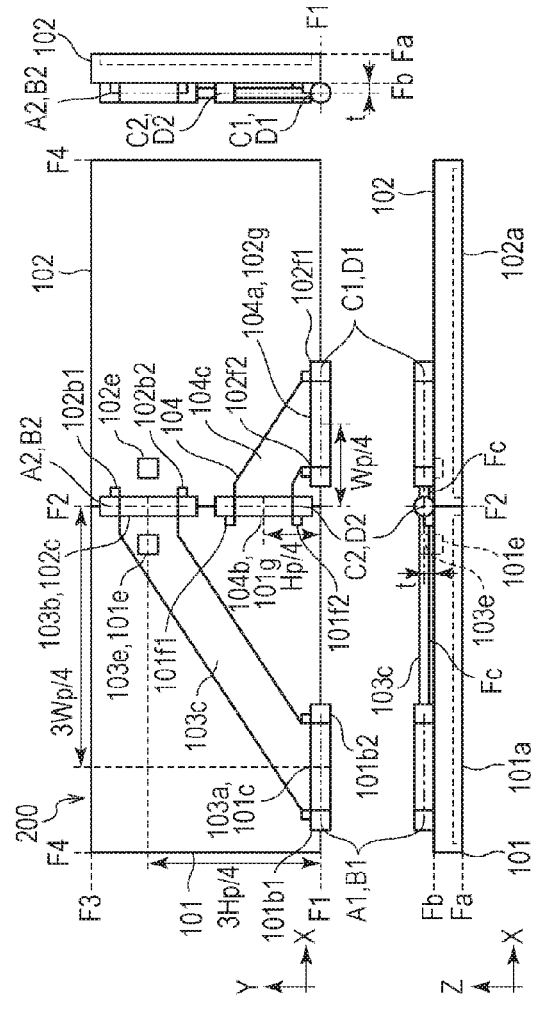
FIG. 15A
FIG. 15B

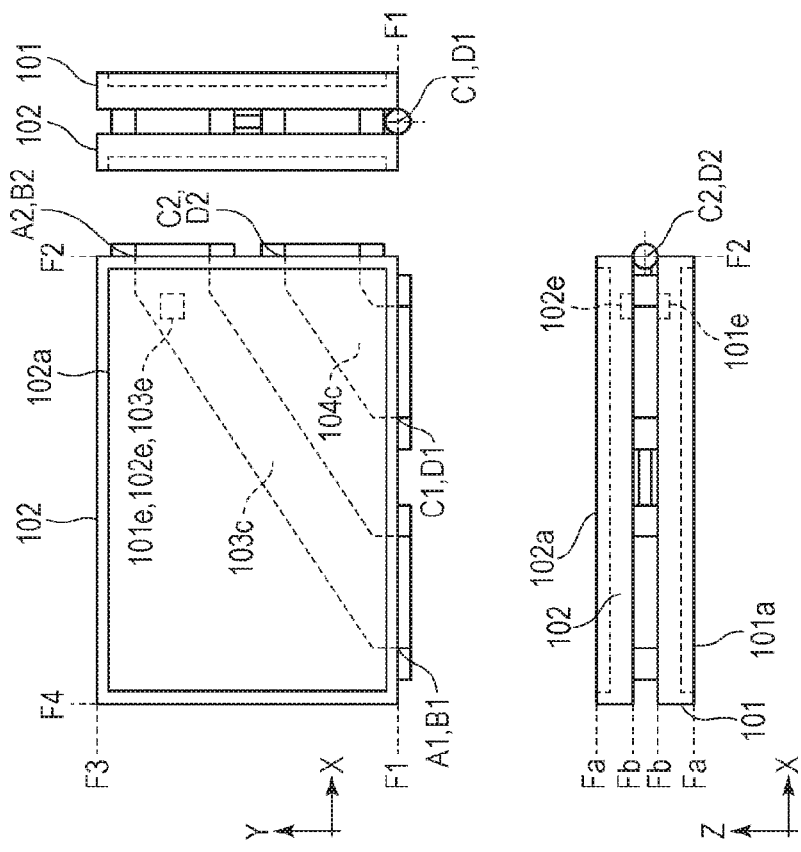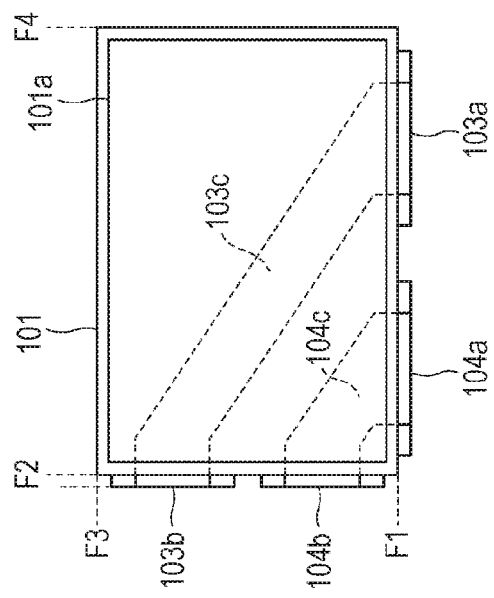
FIG. 16A
FIG. 16B

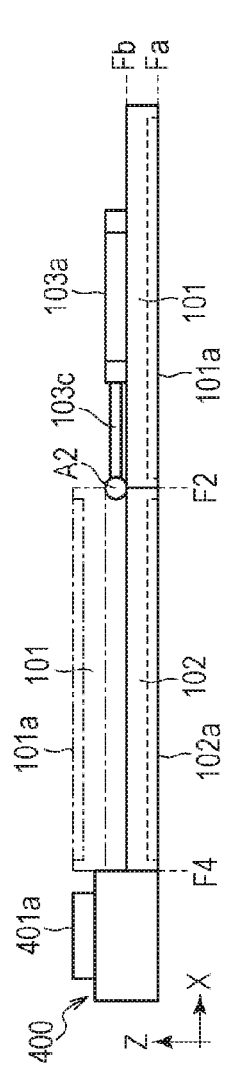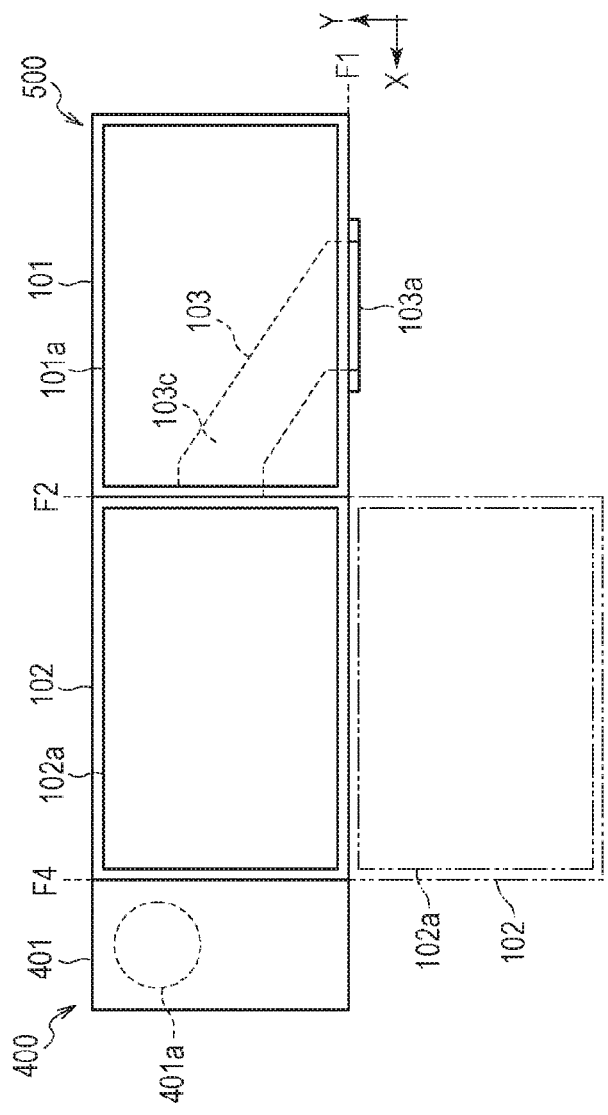
FIG. 20A
FIG. 20B

DISPLAY APPARATUS

BACKGROUND

Field

Aspects of the present invention generally relate to a display apparatus having panels including display units in which relative positions of the panels are changeable.

Description of the Related Art

Conventionally, there has been a display apparatus having panels each including a display unit in which relative positions of the panels are changeable. Japanese Patent Laid-Open No. 2010-266752 discloses a display apparatus having two panels connected with a connector which is mountain-foldable and valley-foldable (see FIG. 13 and FIGS. 14A to 14D, for example).

SUMMARY

An aspect of the present invention is a display apparatus including a first panel having a display unit on a first plane having a first side and a second side orthogonal to the first side, a second panel having a display unit on a second plane having a third side and a fourth side orthogonal to the third side, a connection member configured to connect the first panel and the second panel, a first holding unit configured to hold a first end portion of the connection member at a position adjacent to the first side the first panel, a second holding unit configured to hold a second end portion of the connection member at a position adjacent to the fourth side of the second panel, and a connection region between the first end portion and the second end portion in the connection member, wherein relative positions of the first panel and the second panel are changed such that the display apparatus has a first state in which the first plane and the second plane face toward a same direction and the first side and the third side are adjacent to each other, a second state in which the first plane and the second plane face toward a same direction and the second side and the fourth side are adjacent to each other, and a third state in which a back side of the first plane and a back side of the second plane face each other, wherein the first end portion is held by the first holding unit so as to be rotatable about a first axis substantially in parallel with the first side, wherein the second end portion is held by the second holding unit so as to be rotatable about a second axis substantially in parallel with the fourth side and orthogonal to the first axis, and wherein the connection region is superimposed on a different one of the panels in the first state and the second state of the display apparatus when the display apparatus is viewed from the first plane side and the second plane side.

According to aspects of the present invention, a display apparatus having panels whose relative positions can be changed to acquire two or more different states.

Further features of aspects of the present invention will become apparent from the following description of exemplary embodiments with reference to the attached drawings.

BRIEF DESCRIPTION OF THE DRAWINGS

FIGS. 5A and 5B illustrate a configuration of the display apparatus unfolded to a double-sided state (third state).

FIG. 7 is a block diagram illustrating an internal configuration of the display apparatus according to an exemplary embodiment of a display apparatus.

FIG. 8 illustrates display control to be performed by the display apparatus according to the first exemplary embodiment of the display apparatus.

FIGS. 9A to 9D are flowcharts illustrating display controls to be performed by the display apparatus according to the first exemplary embodiment of the display apparatus.

FIGS. 15A and 15B illustrate a configuration of a display apparatus which is a second exemplary embodiment of the display apparatus in a case where it is horizontally unfolded (first state).

FIGS. 16A and 16B illustrate a configuration of the display apparatus which is the second exemplary embodiment of the display apparatus in a case where it has a double-sided state (third state).

FIGS. 20A and 20B exemplarily illustrate a case where a display apparatus which is a variation example of a display apparatus is applied to an imaging apparatus.

DESCRIPTION OF THE EMBODIMENTS

Embodiments of aspects of the present invention will be described in detail below with reference to attached drawings.

First Exemplary Embodiment

Figure 1:
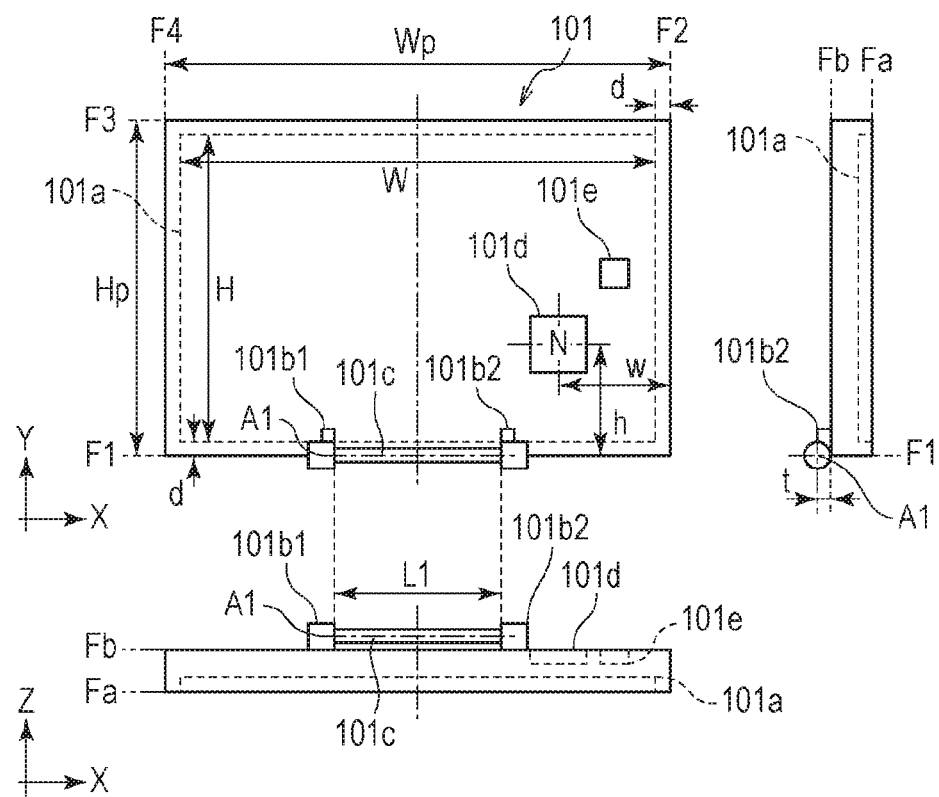
FIG. 1 illustrates three views of a first panel included in a display apparatus according to a first exemplary embodiment of a display apparatus.

A configuration of a display apparatus 100 which is a display apparatus according to a first exemplary embodiment will be described with reference to FIGS. 1 to 14F. First of all, a first panel 101 will be described with reference to FIG. 1. FIG. 1 illustrates three views of the first panel 101 included in the display apparatus 100 which is the first exemplary embodiment of the display apparatus embodying aspects of the present invention.

The first panel 101 is a first housing, which is flat and planar, having rectangular planes Fa and Fb, which will be described below, each having longer sides (first sides) having a length of Wp and shorter sides (second side) having a length of Hp. Assume that, referring to FIG. 1, the direction parallel to the longer sides of the first panel 101 is an X direction, and the direction parallel to the shorter sides of the first panel 101 is a Y direction. Further assume that the direction of thickness of the first panel 101 is a Z direction. The X to Z directions are substantially orthogonal to each other.

The display unit (first display unit) 101a is a display unit configured by a TFT type LCD (thin-film transistor driving type liquid crystal display) which can display a content changeable by a display control circuit, which will be described below. The following description assumes that the front side of the first panel 101 provided in the display unit 101a is a plane (first plane) Fa and that the back side thereof is a plane Fb. It should be noted that the display unit may be an organic electroluminescence device (organic EL device).

The display unit 101a is rectangular and has longer sides having a length of W and shorter sides having a length of H. The ratio of the longer sides and the shorter sides of the display unit 101a is defined as 3:2 which is often used for general photographs, but other ratios may be used.

As illustrated in FIG. 1, a distance (frame width) d from a contour of the display unit 101a to the edge of the first panel 101 on the plane Fa is equal to or less than 1/10 of the length W of the longer sides and the length H of the shorter sides of the display unit 101a. With this configuration, when the display apparatus 100 is transformed to one of unfolded states, which will be described below, the edge part between the display unit 101a and a display unit 102a, which will be described below, may be unremarkable. It should be noted that the first panel 101 superimposing on the frame width d in the Z direction in FIG. 1 internally has a drive unit and wiring, not illustrated, for driving the display unit 101a.

Axial supporting portions 101b1 and 101b2 are supporting units configured to support an axis 101c, which will be described below, and are provided on the plane Fb of the first panel 101. The axis 101c is a cylindrical axis having both ends fixed to the axial supporting portion 101b1 and 101b2. The axial supporting portions 101b1 and 101b2 and the axis 101c will collectively be called a first holding unit. The first holding unit holds a hinge end portion (first end portion) 103a of a hinge 103, which will be described below.

The first holding unit (axial supporting portions 101b1 and 101b2 and axis 101c) is provided adjacently to the longer side (first side) of the plane Fb of the first panel 101.

Viewing the first panel 101 from the plane Fb, assume that the side on which the first holding unit of the first panel 101 is provided is a lower side and that the opposite side thereof is an upper side. The side having a sensor 101e, which will be described below, is a right-hand side, and the opposite side is a left-hand side. Hereinafter, among side faces defined between the plane Fa and the plane Fb of the first panel 101, the lower side face, the right-hand side face, the upper side face and the left side face of the first panel 101 will be called a plane F1, a plane F2, a plane F3, and a plane F4, respectively.

In this case, a central axis (first axis) A1 of the axis 101c is located at a position away from the plane Fb by a distance t in the opposite direction (Z direction) of the plane Fa on the plane including the plane F1. The axial supporting portions 101b1 and 101b2 are separated by a distance L1 in the direction (X direction) parallel to the longer sides of the first panel 101 on the plane Fb.

It should be noted that, in the X direction, the axial supporting portions 101b1 and 101b2 are fixed to the plane Fb of the first panel 101 such that the midpoint from the axial supporting portion 101b1 to the axial supporting portion 101b2 can be matched with the center of the longer sides of the first panel 101.

A magnet 101d is a planar magnet (first locking unit) provided on the plane Fb of the first panel 101. According to this exemplary embodiment, the plane Fb of the first panel 101 has a recess to fit to the shape of the magnet 101d. Placing the magnet 101d to the recess can prevent projection of the magnet 101d from the surrounding plane Fb.

The magnet 101d is magnetized such that the side closer to the plane Fb can be the N pole. Viewing from the plane Fb, the distance from the center of the magnet 101d to the plane F1 is equal to a distance h, and the distance from the center of the magnet 101d to the plane F2 is equal to a distance w. As illustrated in FIG. 1, the magnet 101d is positioned such that the distance h and the distance w can be equal.

The sensor 101e is a sensor (first detecting unit) having a Hall device which detects magnetic force and is provided such that it is not projected from the plane Fb, like the magnet 101d. Details of the magnet 101d and the sensor 101e as well as a magnet 102d and a sensor 102e provided on a second panel 102 will be described below.

Figure 2:
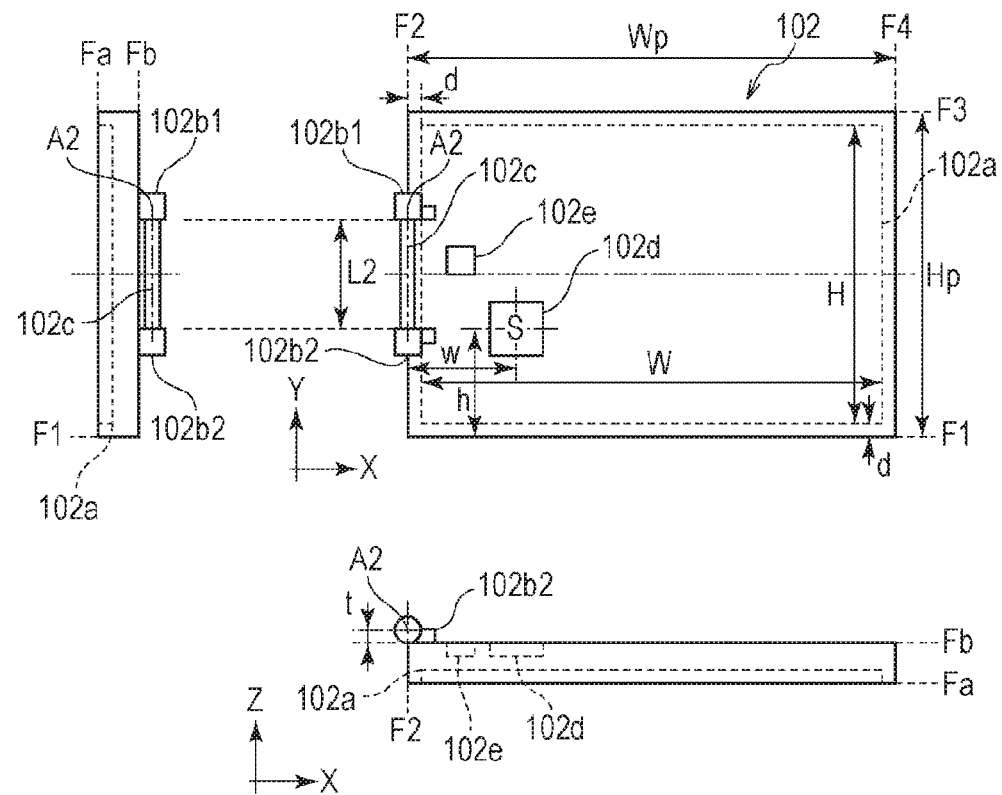
FIG. 2 illustrates three views of a second panel included in the display apparatus according to the first exemplary embodiment of the display apparatus.

Next, the second panel 102 will be described in detail with reference to FIG. 2. FIG. 2 illustrates three views of the second panel 102 included in the display apparatus 100 which is the first exemplary embodiment of the display apparatus embodying aspects of the present invention.

The second panel 102 is flat planar second housing having rectangular planes Fa and Fb, which will be described below, each having longer sides (third sides) having a length of Wp and shorter sides (fourth sides) having a length of Hp. Assume that, referring to FIG. 2, the direction parallel to the longer sides of the second panel 102 is an X direction, and the direction parallel to the shorter sides of the second panel 102 is a Y direction. Further assume that the direction of thickness of the second panel 102 is a Z direction. The X to Z directions are substantially orthogonal to each other. The directions X to Z in FIGS. 1 and 2 are identical to each other.

The display unit (second display unit) 102a is a display unit having the same configuration as that of the first display unit 101a. Like the first panel 101, the following description assumes that the plane having the display unit 102a is a plane (second plane) Fa and that the back side thereof is a plane Fb, also in the second panel 102.

Axial supporting portions 102b1 and 102b2 are supporting units configured to support an axis 102c, which will be described below, and are provided on the plane Fb of the second panel 102. The axis 102c is a cylindrical axis having both ends fixed to the axial supporting portion 102b1 and 102b2. The axial supporting portions 102b1 and 102b2 and the axis 102c will collectively be called a second holding unit. The second holding unit holds a hinge end portion (second end portion) 103b of the hinge 103, which will be described below.

The second holding unit (axial supporting portions 102b1 and 102b2 and axis 102c) is provided at an edge of the shorter side (fourth side) of the plane Fb on the second panel 102.

Viewing the second panel 102 from the plane Fb, assume that the side on which the second holding unit is provided is a left-hand side and that the opposite side thereof is a right-hand side. The side having a magnet 102d, which will be described below, is a lower side, and the opposite side is an upper side. Hereinafter, among side faces defined between the plane Fa and the plane Fb of the second panel 102, the lower side face, left-hand side face, upper side face and right-hand side face of the second panel 102 will be called a plane F1, a plane F2, a plane F3, and a plane F4, respectively. In other words, comparing the second panel 102 and the first panel 101, the left-right positions of the side F2 and the side F4 are different.

On a plane substantially parallel to the plane Fb and identical to the plane F2, the central axis (second axis) A2 of the axis 102c positions away from the plane Fb by a distance t in the opposite direction (Z direction) of the plane Fa. The distance t from the plane Fb to the axis A2 is sufficiently small and is equal to or shorter than one-tenth of the length W of the longer side and the length H of the shorter side of the display unit 102a.

The axial supporting portions 102b1 and 102b2 are separated by a distance L2 in the direction (Y direction) parallel to the shorter sides of the second panel 102 on the plane Fb. It should be noted that, in the Y direction, the axial supporting portions 102b1 and 102b2 are fixed to the plane Fb of the second panel 102 such that the midpoint from the axial supporting portion 102b1 to the axial supporting portion 102b2 can be substantially matched with the center of the shorter sides of the second panel 102.

A magnet 102d is a planar magnet (second locking unit) provided on the plane Fb of the second panel 102. Like the magnet 101d on the first panel 101, the magnet 102d is also provided so as not to project from the surrounding plane Fb. The magnet 102d is magnetized such that the side closer to the plane Fb can be the S pole. Because the position of the magnet 102d on the second panel 102 is the same as the magnet 101d, the description will be omitted.

The sensor 102e is a sensor (second detection unit) having a Hall device which detects magnetic force and is provided on the plane Fb of the second panel 102 such that it is not projected from the plane Fb, like the magnet 102d.

The display apparatus 100 according to this exemplary embodiment can be transformed to states (unfolded states) in which the display unit 101a and the display unit 102a face toward the same direction and a state (double-sided state) in which the display unit 101a and the display unit 102a face toward different directions from each other. The unfolded states of the display apparatus 100 may include a horizontally unfolded state (first state) in which a shorter side (second side) of the first panel 101 is adjacent to a shorter side (fourth side) of the second panel 102. In other words, when the display apparatus 100 has the horizontally unfolded state (first state), the longer sides of the first panel 101 and the second panel 102 position on the mutual extensions of the longer sides.

The unfolded states of the display apparatus 100 may further include a vertically unfolded state (second state) in which the longer side (first side) of the first panel 101 and the longer side (third side) of the second panel 102 are adjacent to each other. In other words, when the display apparatus 100 has the vertically unfolded state (second state), the shorter sides of the first panel and the second panel position on the mutual extensions of the shorter sides.

More specifically, when the display apparatus 100 has the horizontally unfolded state, the planes Fb of the first panel 101 and the second panel 102 face toward the same direction, and the longer side (third side) of the second panel 102 positions on the substantial extension of the longer side (first side) of the first panel 101. When the display apparatus 100 has the vertically unfolded state, the planes Fb of the first panel 101 and the second panel 102 face toward the same direction, and the shorter side (fourth side) of the second panel 102 positions on the substantial extension of the shorter side (second side) of the first panel 101.

When the planes Fb of the first panel 101 and the second panel 102 face toward the substantially same direction, the angle formed by the planes Fb of the panels may be within a range of 180 degrees±5 degrees, viewing the display apparatus 100 from the side face (F1 to F4). It should be noted that, when the display apparatus 100 has the double-sided state, which will be described below, the planes Fb of the panel form an angle of 0 degrees.

When predetermined sides of the first panel 101 and the second panel 102 position substantially on the mutual extension of the sides, the angle formed by the sides of the panels may be within a range of 180 degrees±5 degrees. It should be noted that, when the display apparatus 100 has the double-sided state, which will be described below, the angle formed by the sides of the panels may be 0 degrees.

Figure 3:
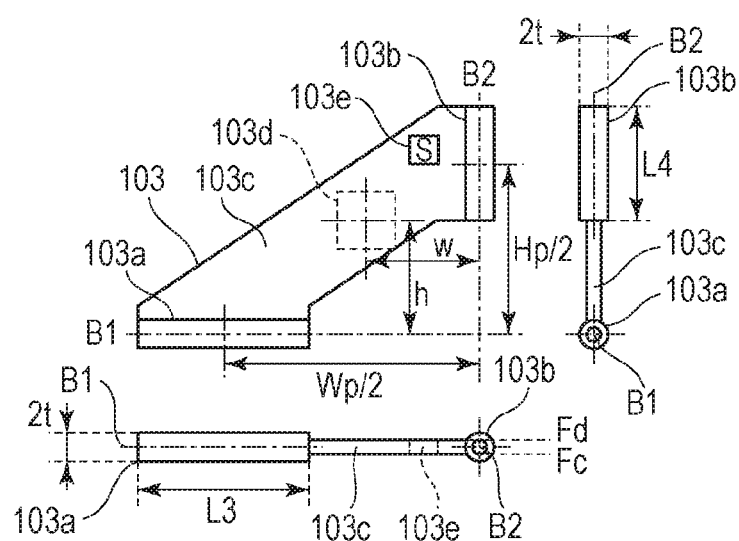
FIG. 3 illustrates three views of a hinge included in the display apparatus according to the first exemplary embodiment of the display apparatus.

Next, a two-axis hinge (hereinafter, simply called a hinge) 103 which is a first connection part of this exemplary embodiment will be described in detail with reference to FIG. 3. FIG. 3 illustrates three views of the hinge 103 included in the display apparatus 100 which is the first exemplary embodiment of the display apparatus embodying aspects of the present invention.

The hinge 103 is a planar first connection member made of a metallic material. A hinge end portion 103a is a first end portion having a cylindrical shape about a rotating shaft (first axis) B1 and being held by the first holding unit among the end portions of hinge 103. The axis B1 of the hinge end portion 103a is substantially parallel to the longer sides of the first panel 101. The hinge 103 is rotatable toward a first direction, which will be described below, about the axis B1. The expression "the axis B1 of the hinge end portion 103a is substantially parallel to the longer sides of the first panel 101" means that the angle between the axis B1 of the hinge end portion 103a and the longer sides of the first panel 101 may be in the range of 180 degrees±10 degrees.

The hinge end portion 103a has an outside diameter of 2t. The hinge end portion 103a has an inside diameter having a dimension slightly larger than the outside diameter of the axis 101c. The hinge end portion 103a has a length L3 parallel to the axis B1 being slightly smaller than the distance L1 of the axis 101c between the axial supporting portions 101b1 and 101b2 described above.

Thus, when the axis 101c of the first holding unit is present within the cylindrical part of the hinge end portion 103a, the hinge end portion 103a and the axis 101c can be relatively rotated with a predetermined play. The movement of the hinge end portion 103a in the direction parallel to the axis B1 is inhibited by the axial supporting portions 101b1 and 101b2.

The hinge end portion 103b is a second end portion having cylindrical shape about a rotating shaft (second axis) B2 and being held by a second holding unit among the end portions of the hinge 103. The axis B2 of the hinge end portion 103b is substantially parallel to the shorter sides of the second panel 102. The hinge 103 rotatable toward a second direction, which will be described below, about the axis B2. The expression "he axis B2 of the hinge end portion 103b is substantially parallel to the shorter sides of the second panel 102" means that the angle between the axis B2 of the hinge end portion 103b and the shorter sides of the second panel 102 may be in the range of 180 degrees±10 degrees.

In other words, the hinge 103 is a connection member (connection unit) rotatable toward different directions from each other about the axis B1 and the axis B2. It should be noted that the rotating shaft B1 and rotating shaft B2 of the hinge 103 are orthogonal to each other on an identical plane.

Like the hinge end portion 103a, the hinge end portion 103b has an outside diameter of 2t and an inside diameter having a dimension slightly larger than the outside diameter of the axis 102c. The hinge end portion 103b has a length L4 parallel to the axis B2 being slightly smaller than the distance L2 of the axis 102c between the axial supporting portions 102b1 and 102b2.

Thus, when the axis 102c of the second holding unit is present within the cylindrical part of the hinge end portion 103b, the hinge end portion 103b and the axis 102c can be relatively rotated with a predetermined play. The movement of the hinge end portion 103b in the direction parallel to the axis B2 is inhibited by the axial supporting portions 102b1 and 102b2.

A connection part 103c is a member made of a magnetic metallic material and functions as a connection region of the hinge 103 by which the first panel 101 and the second panel 102 can relatively rotate. According to this exemplary embodiment, the connection part 103c and hinge end portions 103a and 103b of the hinge 103 are independent from each other, and the hinge end portions 103a and 103b are fixed to the connection part 103c. However, an embodiment of aspects of the present invention is not limited thereto. For example, these components may be integrated. The connection part 103c is planar, and a plane (front surface) having a magnet 103e, which will be described below, will be called a plane Fc, and a surface at the back thereof will be called a plane Fd.

The distance from a midpoint of the hinge end portion 103a in the direction parallel to the axis B1 to the axis B2 is equal to the half (Wp/2) of the length Wp of the longer sides of the first panel 101 and second panel 102. The distance from a midpoint of the hinge end portion 103b in the direction parallel to the axis B2 to the axis B1 is equal to the half (Hp/2) of the length Hp of the shorter sides of the first panel 101 and second panel 102.

The range (locking range) 103d indicated by a broken frame in FIG. 3 is a range where the connection part (connection region) 103c superimposed on the first panel 101 or second panel 102 is superimposed on the magnet 101d or the magnet 102d. The locking range 103d is a range on the connection part 103c where the distance from the axis B1 to the center is equal to the distance h and the distance from the axis B2 to the center is equal to the distance W when viewed from the plane Fd. The magnet 101d or 102d may be absorbed to the locking range 103d so that the hinge 103 can be locked by the magnet 101d or magnet 102d. With this configuration, the display apparatus 100 can be maintained one of the horizontally unfolded state, the vertically unfolded state, and the double-sided state, which will be described below.

Having described that, according to this exemplary embodiment, the connection part 103c is, as a whole, made of a magnetic material, another magnetic member may be fixed at a position corresponding to the locking range 103d of the connection part 103d.

The magnet 103e for detection is a planer unit to be detected and is provided on the connection part 103c such that it does not project from the plane Fc and the plane Fd. A plane closer to the plane Fc of the magnet 103e has an N pole, and a plane closer to the plane Fd has an S pole. The display apparatus 100 according to this exemplary embodiment may detect magnetic force of the magnet 103e by using the sensors 101e and 102e to detect (identify) the unfolded state of the display apparatus 100. Details of this will be described below.

Next, a configuration and the states of the display apparatus 100 will be described below with reference to FIGS. 4A to 6B. The display apparatus 100 includes the first panel 101 having the display unit 101a, the second panel 102 having the display unit 102a, and the hinge 103 configured to connect the first panel 101 and the second panel 102 in a manner that the relative positions of the first panel 101 and the second panel 102 can be changed.

In this case, the two end portions of the hinge 103 are held by the first holding unit provided on the first panel 101 and the second holding unit provided in the second panel 102 such that the end portions can rotate.

In the display apparatus 100 of this exemplary embodiment with this configuration, the first panel 101 and the second panel 102 can rotate relatively, and the relative positions of the first panel 101 and the second panel 102 can be changed.

The directions in which the first panel 101 and the second panel 102 can relatively rotate are dependent on the two rotating shafts B1 and B2 about the two hinge end portions 103a and 103b included in the hinge 103. In other words, in the display apparatus 100 of this exemplary embodiment, the first panel 101 and the second panel 102 are relatively rotated about a plurality of axes orthogonal to each other so that the relative positions of the panels can be changed. The states that the display apparatus 100 can take as a result of transformations will be described.

Figure 4A:
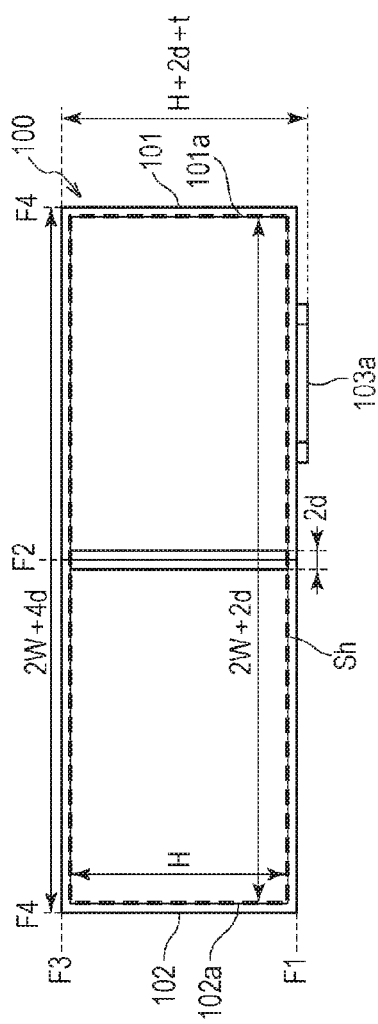
FIGS. 4A and 4B illustrate a configuration of the display apparatus which is unfolded horizontally (a first state).
Figure 4B:
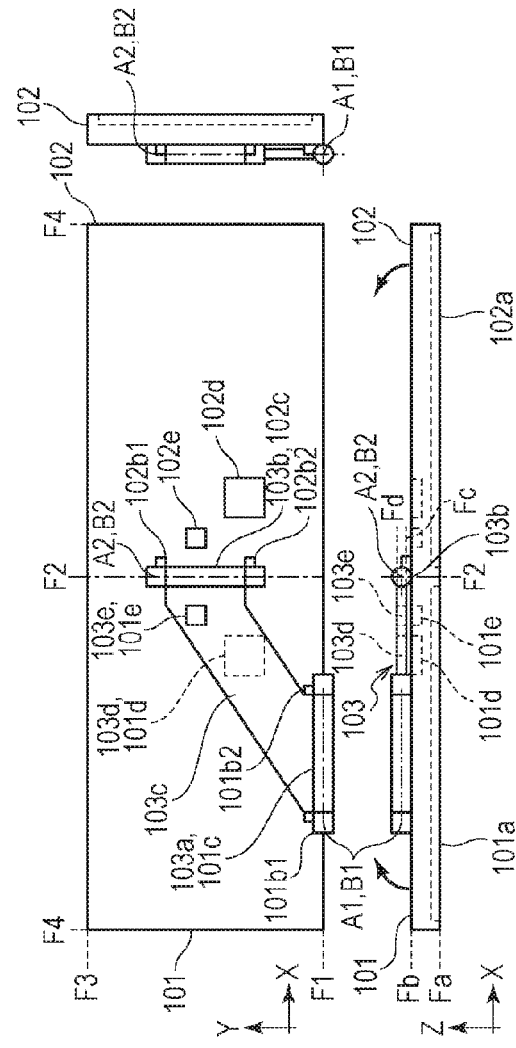

First, the horizontally unfolded state of the display apparatus 100 will be described with reference to FIGS. 4A and 4B. FIGS. 4A and 4B illustrate a configuration of the display apparatus 100 having the horizontally unfolded state (first state). FIG. 4A illustrates the display apparatus 100 viewed from the front side (the plane having the display units 101a and 102a). FIG. 4B illustrates three views about the display apparatus 100 viewed from the back side (the opposite side of the plane having the display units 101a and 102a).

In the display apparatus 100 of this exemplary embodiment, as described above, the hinge end portion 103a and the axis 101c held within the hinge end portion 103a slide to rotate relatively to each other. Thus, the hinge 103 is held rotatably about the rotating shaft B1 (substantially matched with the central axis A1 in the state) with respect to the first panel 101.

In the same manner, the hinge end portion 103b and the axis 102c slide to turn relatively to each other. Thus, the hinge 103 can be held rotatable about the rotating shaft B2 (substantially matched with the central axis A2 in the state) with respect to the second panel 102.

As illustrated in FIG. 4A, the state in which the planes F2 of the first panel 101 and second panel 102 are abutted to each other and the display unit 101a and the display unit 102a face toward substantially the same direction is the horizontally unfolded state of the display apparatus 100. In this state, viewing from the plane Fa, the shorter sides of the first panel 101 and second panel 102 are adjacent to each other, and the longer side of the second panel 102 positions on the substantial extension of the longer side of the first panel 101.

When the display apparatus 100 has the horizontally unfolded state, viewing from the plane Fa, the display unit 101a and the display unit 102a are placed such that their shorter side are spaced apart by a distance 2d. In this case, the longer side of the entire display apparatus 100 has a dimension of 2W+4d, and the shorter side thereof has a dimension of H. The display apparatus 100 in this state has a whole display part (hereinafter, called virtual display part) Sh illustrated as a region indicated by the broken frame in FIG. 4A. If the frame width d is sufficiently small and is ignorable with respect to the lengths of the longer sides and the shorter sides of the virtual display part, the ratio of the length of the longer side to the length of the shorter side of the virtual display part Sh is equal to about 3:1.

When the display apparatus 100 has the horizontally unfolded state, the connection part (connection region) 103c of the hinge 103 is superimposed on the first panel 101 in the display direction (the thickness direction of the display apparatus 100) of the display units 101a and 102a. In this state, the plane Fb of the first panel 101 and the plane Fc of the connection part 103c face each other substantially in parallel.

In this state, the magnet 101d absorbs (the locking range 103d of) the hinge 103, and the hinge 103 is locked to the first panel 101. Furthermore in this state, because the sensor 101e and the magnet 103e face in proximity, the sensor 101e can detect the magnetic force of the magnet 103e. Based on the detection of the magnetic force of the magnet 103e by the sensor 101e, display control circuits (display control units) 110 and 120, which will be described below, can detect that the display apparatus 100 currently has the horizontally unfolded state. Details thereof will be described below.

Next, the double-sided state (third state) of the display apparatus 100 will be described with reference to FIGS. 5A and 5B. FIGS. 5A and 5B illustrate a configuration of the display apparatus 100 having the double-sided state. FIG. 5A illustrates the display apparatus 100 viewed from the front side (the plane having the display unit 101a). FIG. 5B illustrates three views having the display apparatus 100 viewed from the back side (the opposite side of the plane having the display unit 102a) at the center.

The double-sided state (third state) of the display apparatus 100 is acquired by rotating the first panel 101 and the second panel 102 relatively 180 degrees about the axis A2 (axis B2) in the direction indicated by the solid arrow illustrated in FIG. 4B from the horizontally unfolded state. The display apparatus 100 can change its state from the double-sided state to the horizontally unfolded state by rotating the first panel 101 and the second panel 102 relatively 180 degrees about the axis A2 (axis B2) in the direction indicated by the broken arrow illustrated in FIG. 5B. The direction of rotation about the axis A2 (B2) as described above will be called a first direction.

As illustrated in FIG. 5A, the state in which the planes F2 of the first panel 101 and the second panel 102 face toward substantially the same direction on the same plane and the back side of the display unit 101a and the back side of the display unit 102a face each other is the double-sided state (third state) of the display apparatus 100. In other words, the state in which the planes Fb of the first panel 101 and the second panel 102 face and are abutted to each other is the double-sided state (third state) of the display apparatus 100.

When the display apparatus 100 has the double-sided state, the display part having longer sides each having a dimension of W and shorter sides having a dimension of H face both of the front side and the back side of the display apparatus 100. Thus, when the display apparatus 100 has the double-sided state, the contours of the first panel 101 and the second panel 102 are substantially matched in the thickness direction of the display apparatus 100.

In this state, the connection part (connection region) 103c of the hinge 103 is superimposed on the first panel 101 and second panel 102 in the thickness direction of the display apparatus 100. Furthermore, in this state, the plane Fb of the first panel 101 and the plane Fc of the connection part 103c face each other in substantially parallel, and the plane Fb of the second panel 102 and the plane Fd of the connection part 103c face each other in substantially parallel.

Thus, when the display apparatus 100 has the double-sided state, the magnet 101d and the magnet 102d absorb the hinge 103 so that the hinge 103 can be locked to the first panel 101 and the second panel 102.

Furthermore, in this state, because the sensor 101e and the magnet 103e, and the sensor 102e and the magnet 103e face each other in proximity, the magnetic force of the magnet 103e is detected by both of the sensor 101e and the sensor 102e. Based on the detection of the magnetic force of the magnet 103e by both of the sensor 101e and the sensor 102e, the display control circuits 110 and 120, which will be described below, can detect that the display apparatus 100 currently has the double-sided state. Details thereof will be described below.

Figure 6A:
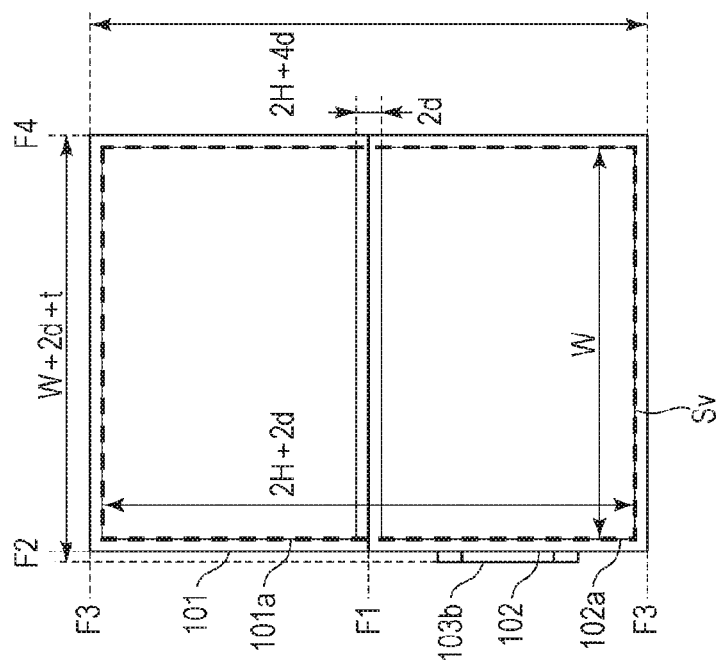
FIGS. 6A and 6B illustrate a configuration of the display apparatus 100 unfolded vertically (second state).
Figure 6B:
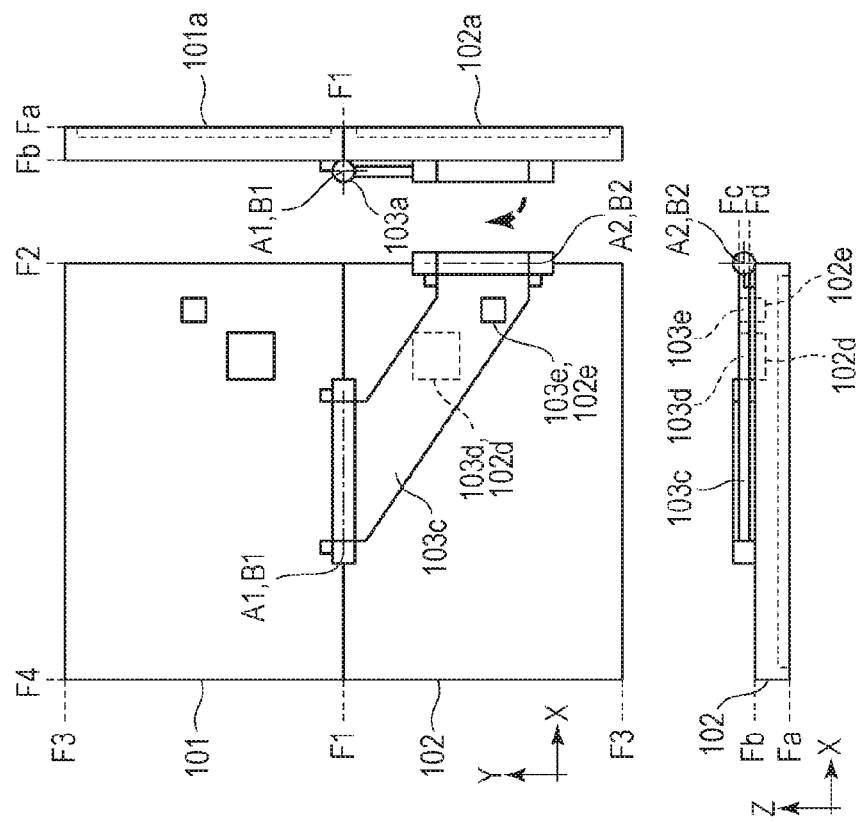

Next, the vertically unfolded state of the display apparatus 100 will be described with reference to FIGS. 6A and 6B. FIGS. 6A and 6B illustrate a configuration of the display apparatus 100 having the vertically unfolded state. FIG. 6A illustrates the display apparatus 100 viewed from the front side (the plane having the display units 101a and 102a). FIG. 6B illustrates three views about the display apparatus 100 viewed from the back side (the opposite side of the plane having the display units 101a and 102a).

The vertically unfolded state (second state) of the display apparatus 100 is acquired by rotating the first panel 101 and the second panel 102 relatively 180 degrees about the axis A1 (axis B1) in the direction indicated by the solid arrow illustrated in FIG. 5B from the double-sided state. The display apparatus 100 can change its state from the vertically unfolded state to the double-sided state by rotating the first panel 101 and the second panel 102 relatively 180 degrees about the axis A1 (axis B1) in the direction indicated by the broken arrow illustrated in FIG. 6B. The direction of rotation of the first panel 101 and second panel 102 about the axis A1 (axis B1) as described above will be called a second direction.

As illustrated in FIG. 6A, the state in which the planes F1 of the first panel 101 and the second panel 102 are abutted to each other and the display unit 101a and the display unit 102a face toward substantially the same direction is the vertically unfolded state of the display apparatus 100. In this state, viewing from the plane Fa, the longer sides of the first panel 101 and second panel 102 are adjacent to each other, and the shorter side of the second panel 102 positions on the substantial extension of the shorter side of the first panel 101.

When the display apparatus 100 has the vertically unfolded state, viewing from the plane Fa, the display unit 101a and the display unit 102a are placed such that their longer sides are spaced apart by the distance 2d. In this case, the longer side of the entire display apparatus 100 has a dimension of 2H+4d, and the shorter side thereof has a dimension of W. The display apparatus 100 in this state has the virtual display part Sh indicated by the broken frame in FIG. 6A. If the frame width d is sufficiently small and is ignorable with respect to the lengths of the longer sides and the shorter sides of the virtual display part, the ratio of the length of the longer side to the length of the shorter side of the virtual display part Sh is equal to about 4:3.

When the display apparatus 100 has the vertically unfolded state, the connection part (connection region) 103c of the hinge 103 is superimposed on the second panel 102 in the display direction (the thickness direction of the display apparatus 100) of the display units 101a and 102a. In this state, the plane Fb of the second panel 102 and the plane Fd of the connection part 103c face each other substantially in parallel.

In this state, the magnet 102d absorbs (the locking range 103d of) the hinge 103, and the hinge 103 is locked to the second panel 102. Furthermore in this state, because the sensor 102e and the magnet 103e face in proximity, the sensor 102e detects the magnetic force of the magnet 103e. Based on the detection of the magnetic force of the magnet 103e by the sensor 102e, the display control circuits 110 and 120, which will be described below, can detect that the display apparatus 100 currently has the vertically unfolded state. Details thereof will be described below.

As described above, in the display apparatus 100 of this exemplary embodiment, the panel on which the connection part 103c of the hinge 103 is superimposed differs among the horizontally unfolded state, the vertically unfolded state, and the double-sided state in the display direction (thickness direction of the display apparatus 100) of the display units 101a and 102a. For example, when the relative positions of the first panel 101 and the second panel 102 change from one unfolded state (such as the vertically unfolded state) to the other unfolded state (such as the horizontally unfolded state), the panel on which the connection part 103c is superimposed changes from one panel (such as the first panel 101) to the other panel (such as the second panel 102). In the double-sided state in the middle of the change from one unfolded state to the other unfolded state of the display apparatus 100, the connection part 103c is superimposed on both of the first panel 101 and the second panel 102 in the thickness direction of the display apparatus 100.

As illustrated in FIG. 4B, when the display apparatus 100 has the horizontally unfolded state, the axis B2 (and axis A2) being the rotating shaft of the hinge 103 is separated from the planes Fb of the first panel 101 and second panel 102 in the Z direction. In this state, the planes F2 of the first panel 101 and the second panel 102 are in contact with each other so that the display unit 101a and the display unit 102a can be brought as close as possible.

As illustrated in FIG. 6B, when the display apparatus 100 has the vertically unfolded state, the axis B1 (and axis A1) being the rotating shaft of the hinge 103 is separated from the planes Fb of the first panel 101 and second panel 102 in the Z direction. In this state, the planes F1 of the first panel 101 and the second panel 102 are in contact with each other so that the display unit 101a and the display unit 102a can be brought as close as possible.

For example, when a plurality of images (divided images) of a single image are displayed by the display unit 101a and display unit 102a, the display unit 101a and display unit 102a separated excessively may give strangeness to a user viewing the display apparatus 100.

On the other hand, the display apparatus 100 of this exemplary embodiment may prevent the hinge end portions 103a and 103b of the hinge 103 from interfering with planes of the first panel 101 and second panel 102 even when the display apparatus 100 changes its state. In both of the horizontally unfolded state and vertically unfolded state of the display apparatus 100, a reduced distance between the first display unit 101a and the second display unit 102a can be achieved. Therefore, the display apparatus 100 of this exemplary embodiment can suppress strangeness to a user viewing displayed images.

The display apparatus 100 has a width of 2W+4d and a height of H+2d+t in the horizontally unfolded state, and a width of W+2d+t and a height of 2H+4d in vertically unfolded state while a width of W+2d+t and a height of H+2d+t in the double-sided state. In other words, in the double-sided state of the display apparatus 100 as illustrated in FIGS. 5A and 5B, the size of the display apparatus 100 can be the half of those in the horizontally unfolded state and the vertically unfolded state.

The display range of the display apparatus 100 has a width of W and a height of H in the double-sided state while a width of 2W (2W+2d when the frame width is not ignored) and a height of H in the horizontally unfolded state. The display range has a width of W and a height of 2H (2H+2d when the frame width is not ignored) in the vertically unfolded state. In other words, as illustrated in FIGS. 4A and 4B and 6A and 6B, the display range of the display apparatus 100 in the unfolded state can be about twice as large as the display apparatus 100 in the double-sided state.

As described above, because the display apparatus 100 of this exemplary embodiment can reduce the size of the entire apparatus and can increase the size of the display range depending on its state, the portability can be improved, and at the same time the display range on one plane can be increased.

In the double-sided state of the display apparatus 100, both of the magnet 101d and the magnet 102d absorb the locking range 103d so that the first panel 101 and the second panel 102 do not rotate relatively easily, compared with the horizontally unfolded state and the vertically unfolded state. Therefore, in the display apparatus 100 in the double-sided state according to this exemplary embodiment can prevent the display apparatus 100 from being unfolded unintentionally in response to an external force caused when the display apparatus 100 is carried, for example.

As described above, the display apparatus 100 of this exemplary embodiment can be transformed easily to three states of the horizontally unfolded state, the double-sided state, and the vertically unfolded state. Therefore, in the display apparatus 100 of this exemplary embodiment, the relative positions of the first panel 101 and the second panel 102 provided in the display units can be changed to a plurality of states. Particularly, one hinge 103 may only be used to change the relative positions of the first panel 101 and the second panel 102 to the vertically unfolded state in which the longer sides are adjacent to each other, the horizontally unfolded state in which the shorter sides are adjacent to each other, and a third state in which the back surfaces of the display units face each other.

With this configuration, the display apparatus 100 of this exemplary embodiment can easily change its state to different three states. Furthermore, in the display apparatus 100 with the configuration, when a plurality of divided images of a single image are displayed by the display unit 101a and the display unit 102a, the relative positions of the panels can be changed freely in accordance with the aspect ratio of and the type of photographing the image to be displayed.

For example, when the ratio of the longer side to the shorter side of an image to be displayed on the whole display apparatus 100 is a ratio often used for a photograph (or image pickup device) such as 3:2 and 16:9, the state of the display apparatus 100 can be changed to the vertically unfolded state. When the ratio of the longer side to the shorter side of an image to be displayed on the whole display apparatus 100 is equal to the ratio corresponding to the scope size often used for movies or a horizontally oriented ratio (such as a ratio of 2:1 or higher) for so-called panorama images, the state of the display apparatus 100 is changed to the horizontally unfolded state.

In this way, the display apparatus 100 of this exemplary embodiment can display an image as large as possible because the relative positions of the panels can be changed in accordance with the ratio (or aspect ratio) of the longer side to the shorter side of the image to be displayed. Particularly, when the display apparatus 100 is applied to an imaging apparatus such as a digital camera, images acquired by the imaging apparatus can be displayed as large as possible in accordance with different sizes (ratio of the sides) of the images.

The display apparatus 100 of this exemplary embodiment can display a single image on both of the display unit 101a and the display unit 102a. Particularly, the display apparatus 100 in the double-sided state can display the same image on the display units so that the convenience can be improved in which a plurality of users can check the image from different directions.

Next, display-related operations to be performed by the display apparatus 100 will be described with reference to FIGS. 7 to 14F. FIG. 7 is a block diagram illustrating an internal configuration of the display apparatus 100 which is an exemplary embodiment of the display apparatus embodying aspects of the present invention. As illustrated in FIG. 7, the first panel 101 further includes the first display control circuit 110, a first power supply unit 111, and a first communicating unit 112, in addition to the aforementioned components. The second panel 102 further includes the second display control circuit 120, a second power supply unit 121, and a second communicating unit 122, in addition to the aforementioned components.

One or more functional blocks illustrated in FIG. 7 may be implemented by hardware such as an ASIC and a programmable logic array (PLA) or may be implemented by a software program or programs executed by a programmable processor such as a CPU and an MPU. They may be implemented by a combination of such a software program or programs and hardware. Therefore, they may be implemented by hardware as an operation subject even though different functional blocks are described as operation subjects.

The first display control circuit 110 is a first display control unit configured to control (display control) display of an image for display (hereinafter, called a display image) on the display unit 101a. The first display control circuit 110 includes a microcomputer (first CPU) and a first memory, not illustrated. The first display control circuit 110 controls a display image to be displayed on the display unit 101a based on detection results from the sensor 101e and sensor 102e.

The second display control circuit 120 is a second display control unit configured to control display of a display image on the display unit 102a. The second display control circuit 120 includes a microcomputer (second CPU) and a second memory, not illustrated. The second display control circuit 120 controls a display image to be displayed on the display unit 102a based on detection results from the sensor 101e and sensor 102e.

In other words, the first display control circuit 110 and the second display control circuit 120 detect a panel or panels superimposed on the connection part 103c in the thickness direction of the display apparatus 100 and executes display control in the display unit 101a and display unit 102a based on the detection results.

The first power supply unit 111 is configured to supply electric power to the components of the first panel 101. The second power supply unit 121 is configured to supply electric power to the components of the second panel 102. When the display apparatus 100 is powered on, electric power is supplied from the first power supply unit 111 to the components of the first panel 101 through the first display control circuit. Also, electric power is supplied from the second power supply unit 121 to the second panel 102 through the second display control circuit.

The first communicating unit 112 and the second communicating unit 122 are configured to transmit and receive various data to and from the first panel 101 and the second panel 102. The first communicating unit 112 and the second communicating unit 122 operate in accordance with instructions from the first display control circuit 110 and the second display control circuit 120. The following description assumes that communication between the first display control circuit 110 and the second display control circuit 120 is executed through the first communicating unit 112 and the second communicating unit 122, respectively.

While the first communicating unit 112 and second communicating unit 122 of this exemplary embodiment are configured to transmit and receive various data by wireless communication, an embodiment of aspects of the present invention is not limited thereto. For example, a cable for communication may be provided along the hinge 103, and the cable for communication may be used to execute communication between the panels. The cable for communication may be a flexible print wiring board (hereinafter, called an FPC). The FPC may be provided along inside of the hinge 103 or an outer face of the hinge 103, and the FPC may be inserted into the first panel 101 and second panel 102.

While the display apparatus 100 of this exemplary embodiment has display control circuits in both of the first panel 101 and the second panel 102, an embodiment of aspects of the present invention is not limited thereto. For example, a display control circuit may be provided in one of the first panel 101 and the second panel 102. In this case, the one of the display control circuits may execute display control relating to the first panel 101 and the second panel 102. More specifically, the first display control circuit (display control unit) 110 provided within the first panel 101 may execute display control on the display unit 102a of the second panel 102 through the corresponding communicating unit or the cable for communication.

Next, a display control method for displaying a display image in the display apparatus 100 will be described with reference to FIG. 8. FIG. 8 is a flowchart describing display control to be performed by the display apparatus 100 which is the first exemplary embodiment of the display apparatus embodying aspects of the present invention. FIG. 8 illustrates detection results (detected states) S1 and S2 from the sensors 101e and 102e, respectively. The state that the sensor 101e detects magnetic force is indicated by S1=1, and the state with no detection is indicated by S1=0. Also, the state in which the sensor 102*e* detects magnetic force is indicated by S2=1, and the state without detection is indicated by S1=0.

The state in which magnetic force is indicated refers to a state in which the sensor 101*e* or 102*e* detects a predetermined value of magnetic force or larger. Thus, when the sensors 101*e* and 102*e* detect magnetic force smaller than the predetermined value, the detection result (detected state) from the sensor 101*e* or 102*e* can be indicated by S1=0 and S2=0.

As illustrated in FIG. 8, when the processing relating to display control of the display apparatus 100 starts, the display control circuit 120 in step S101 transmits a detected state from the sensor 102*e* to the display control circuit 110 through the second communicating unit 122. The display control circuit (detecting unit) 110 then detects a panel superimposed on the connection part 103*c* based on the detected state from the sensor 101*e* and the detected state from the sensor 102*e*. In other words, the display control circuit 110 detects (determines) the state of the display apparatus 100 based on the detection results from the sensors 101*e* and 102*e*.

The processing in step S101 will be described below. If the detection results in step S101 (detected states from the sensors 101*e* and 102*e*) are S1=1 and S2=1, it indicates the state that both of the sensor 101*e* and the sensor 102*e* are detecting magnetic force. Thus, the display control circuit 110 identifies the state in which the connection part 103*c* is superimposed on both of the first panel 101 and the second panel 102 in the thickness direction (Z direction) of the display apparatus 100. In other words, the display control circuit 110 determines that the state of the display apparatus 100 is the double-sided state.

When the detection results in step S101 are S1=1 and S2=0, it indicates the state in which only the sensor 101*e* is detecting magnetic force. Thus, the display control circuit 110 determines that the connection part 103*c* is superimposed on the first panel 101 in the thickness direction (Z direction) of the display apparatus 100. In other words, the display control circuit 110 determines that the state of the display apparatus 100 is the horizontally unfolded state.

When the detection results in step S101 are S1=0 and S2=1, it indicates the state in which only the sensor 102*e* is detecting magnetic force. Therefore, the display control circuit 110 identifies the state in which the connection part 103*c* is superimposed on the second panel 102 in the thickness direction (Z direction) of the display apparatus 100. In other words, the display control circuit 110 determines that the state of the display apparatus 100 is the vertically unfolded state.

Furthermore, when the detection results in step S101 are S1=0 and S2=0, it indicates the state in which both of the sensor 101*e* and the sensor 102*e* are not detecting (cannot detect) magnetic force. Therefore, the display control circuit 110 determines that the connection part 103*c* is not superimposed on the panels in the thickness direction (Z direction) of the display apparatus 100. In other words, the display control circuit 110 determines that the display apparatus 100 has a state in which some error is occurring (hereinafter, called an error state).

It should be noted that the determinations and identification in the processing in step S101 may be executed by the display control circuit 120 instead of the display control circuit 110. In this case, the detected state from the sensor 101*e* is transmitted from the display control circuit 110 to the display control circuit 120 through the first communicating unit 112.

Referring back to FIG. 8, if the determination results in step S101 are S1=1 and S2=1, the processing moves to step S102. If the detection results in step S101 are S1=1 and S2=0, the processing moves to step S103. If the detection results in step S101 are S1=0 and S2=1, the processing moves to step S104. If the detection results in step S101 are S1=0 and S2=0, the processing moves to step S104.

Display control to be performed by the display apparatus 100 in the aforementioned states will be described below with reference to FIGS. 9A to 13E. First, with reference to FIGS. 9A to 9D and FIGS. 10A to 10C, display control to be performed when the display apparatus 100 has the double-sided state will be described.

FIGS. 9A to 9D are flowcharts illustrating display controls to be performed by the display apparatus 100 which is the first exemplary embodiment of the display apparatus embodying aspects of the present invention. FIG. 9A is a flowchart illustrating a display control to be performed when it is determined that the display apparatus 100 has the double-sided state. FIG. 9B is a flowchart illustrating a display control to be performed when it is determined that the display apparatus 100 has the horizontally unfolded state. FIG. 9C is a flowchart illustrating a display control to be performed when it is determined that the display apparatus 100 has the vertically unfolded state. FIG. 9D is a flowchart illustrating a display control to be performed when it is determined that the display apparatus 100 has display apparatus 100 an error state.

Figure 10A:
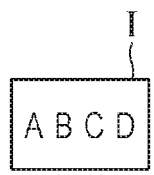
FIGS. 10A to 10C exemplarily illustrate a method for a first display control for displaying a single display image when the display apparatus includes a double-sided state (third state).
Figure 10B:
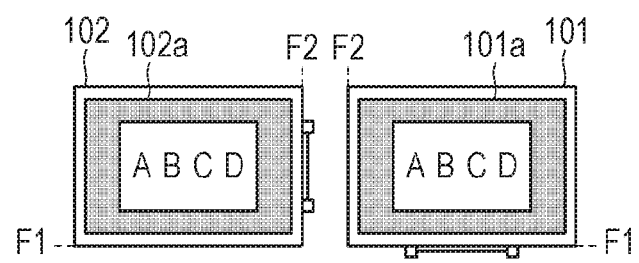
Figure 10C:
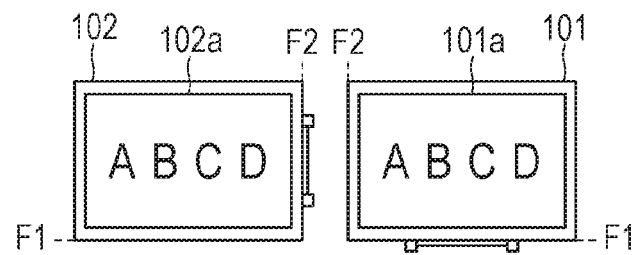

FIGS. 10A to 10C exemplarily illustrate a method for displaying a single display image in a case where the display apparatus 100 according to aspects of the present invention has the double-sided state. FIG. 10A exemplarily illustrates a single image (hereinafter called an original image) I before it is displayed by the display apparatus 100. FIG. 10B and FIG. 10C exemplarily illustrate how a display image is to be displayed on two display units.

In step S102 which is described above, a display control (second display control) to be performed in a case where the display apparatus 100 has the double-sided state starts. The display control circuit 110 in step S1021 determines display images to be displayed on the display unit 101*a* and display unit 102*a* based on the original image I. The display control circuit 110 then transmits information regarding the display image to be displayed on the display unit 102*a* to the display control circuit 120 through the first communicating unit 112 (as illustrated in FIG. 10B). It should be noted that when the display apparatus 100 has the double-sided state, the same display images as the original image I are displayed by the two display units.

Next, the display control circuit 110 in step S1022 enlarges or reduces the size of the display image determined for display on the display unit 101*a* in step S1021 to a maximum size displayable on the display unit 101*a*. The display control circuit 120 also enlarges or reduces the size of the display image determined for display on the display unit 102*a* in step S1021 to a maximum size displayable on the display unit 102*a* (as in FIG. 10C). The processing in steps S1021 to S1022 is controlled by the display control circuits 110 and 120 such that the display images can be displayed on the display unit 101*a* and the display unit 102*a* substantially at the same time.

As described above, when the display apparatus 100 has the double-sided state, the display control circuit 110 executes the display control (second display control) for causing the display unit 101*a* and the display unit 102*a* to display a single image. The display controlling method in a case where the display apparatus 100 has the double-sided state has been described above.

Figure 11A:
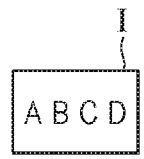
FIGS. 11A to 11F exemplarily illustrate a method for the first display control for displaying a single display image in divided manners when the display apparatus is horizontally unfolded (first state).

Next, with reference to FIGS. 9A to 9D and FIGS. 11A to 11E, the display control to be performed when the display apparatus 100 has the horizontally unfolded state will be described. FIGS. 11A to 11F exemplarily illustrate a method for displaying divisions of a single display image when the display apparatus 100 according to aspects of the present invention has the horizontally unfolded state. FIG. 11A exemplarity illustrates an original image I before it is displayed by the display apparatus 100. FIG. 11B to FIG. 11F exemplarily illustrate how divided display images I1 and I2 of the original image I are to be displayed on two display units.

Figure 11B:
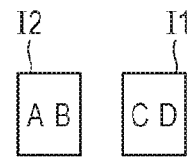

In step S103 which is described above, a display control (first display control) to be performed in a case where the display apparatus 100 has the horizontally unfolded state starts. The display control circuit 110 in step S1031 divides the original image I in a manner that the longer side is divided into two equal parts to generate a display image I1 for display on the display unit 101a and the display image I2 for display on the display unit 102a (as illustrated in FIG. 11B).

Figure 11C:
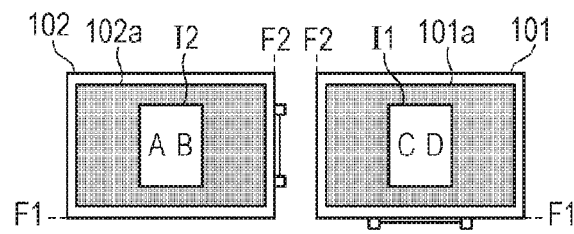

Next, the display control circuit 110 in step S1032 determines the generated display image I1 as the display image to be displayed on the display unit 101a. The generated display image I2 is also determined as the display image to be displayed on the display unit 102a (as illustrated in FIG. 11C). The display control circuit 110 then transmits information regarding the display image 2 to be displayed on the display unit 102a to the display control circuit 120 through the first communicating unit 112.

Next, in step S1033, the display control circuit 110 rotates the display image I1 such that the bottom (lower side) of the display image I1 can direct toward the plane F1 of the first panel 101. The display control circuit 120 also rotates the display image I2 such that the bottom (lower side) of the display image I2 can direct toward the plane F2 of the second panel 102. In other words, the display images I1 and I2 are rotated such that the shorter sides of the display images I1 and I2 acquired by dividing the original image I can direct toward the planes F1 of the first panel 101 and the second panel 102.

The processing in step S1033 is performed for adjusting the top and bottom and right and left orientations of an image (original image) read out from a memory, not illustrated, provided in the display apparatus 100 to fit to the state of the display apparatus 100. When the display apparatus 100 has the horizontally unfolded state, the display images I1 and I2 are rotated such that the top and bottom and right and left orientations of the original image I can agree with the top and bottom and right and left orientations of the display images I1 and I2.

Figure 11D:
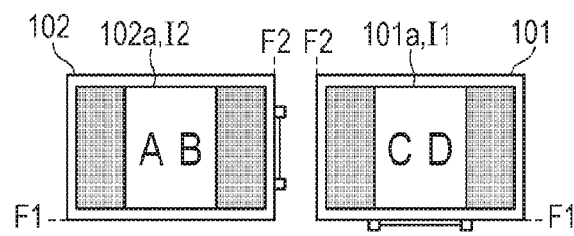

Next, the display control circuit 110 in step S1034 enlarges or reduces the size of the display image I1 to a maximum size displayable on the display unit 101a. The display control circuit 120 also enlarges or reduces the display image I2 to a maximum size displayable on the display unit 102a (as illustrated in FIG. 11D).

Figure 11E:
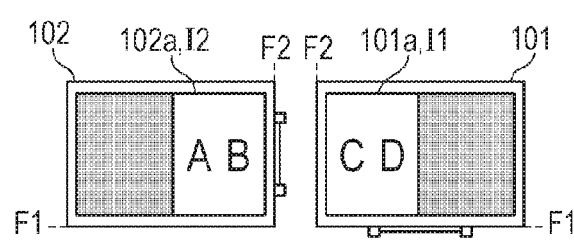
Figure 11F:
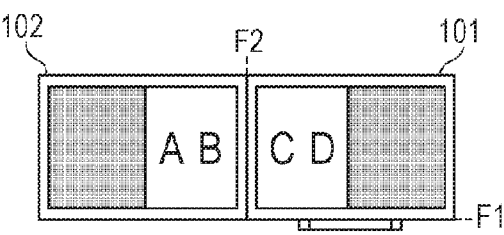

Next, the display control circuit 110 in step S1035 changes (moves) the position for displaying the display image I1 within the display unit 101a to be closer to the plane F2 of the first panel 101. The display control circuit 120 also changes (moves) the position for displaying the display image I2 within the display unit 102a to be closer to the plane F2 of the second panel 102 (as illustrated in FIG. 11E). The display controlling method in a case where the display apparatus 100 has the horizontally unfolded state has been described above. As described above, when the display apparatus 100 has the horizontally unfolded state, the display image I1 and the display image I2 are displayed adjacently to each other (as illustrated in FIG. 11F).

Figure 12A:
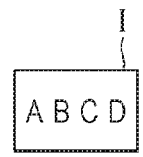
FIGS. 12A to 12F exemplarily illustrate a method for the first display control for displaying a single display image in divided manners when the display apparatus is vertically unfolded (second state).
Figure 12B:
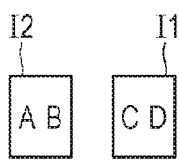
Figure 12C:
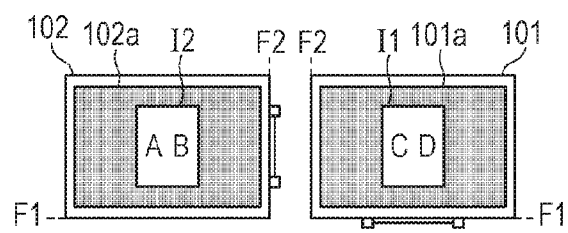
Figure 12D:
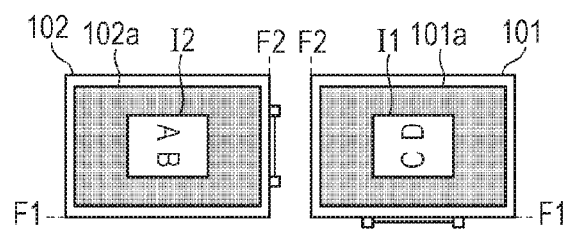

Next, with reference to FIGS. 9A to 9D and FIGS. 12A to 12F, the display control to be performed when the display apparatus 100 has the vertically unfolded state will be described. FIGS. 12A to 12F exemplarily illustrate a method for displaying divisions of a single display image when the display apparatus 100 according to aspects of the present invention has the vertically unfolded state. FIG. 12A exemplarity illustrates an original image I before it is displayed by the display apparatus 100. FIG. 12B to FIG. 12F exemplarily illustrate how divided display images I1 and I2 of the original image I are to be displayed on two display units.

Because basically the same display control is executed in a case where the display apparatus 100 has the vertically unfolded state and in a case where the display apparatus 100 has the horizontally unfolded state, the following description only mentions differences from the case where the display apparatus 100 has the horizontally unfolded state.

Next, in step S1043, the display control circuit 110 rotates the display image I1 such that the top (upper side) of the display image I1 can direct toward the plane F2 of the first panel 101. The display control circuit 120 also rotates the display image I2 such that the top (upper side) of the display image I2 can direct toward the plane F2 of the second panel 102. In other words, the display images I1 and I2 are rotated such that the longer sides of the display images I1 and I2 acquired by dividing the original image I can direct toward the planes F1 of the first panel 101 and the second panel 102. Because the processing in step S1044 is substantially the same as the processing in step S1034, the repetitive description will be omitted.

Figure 12E:
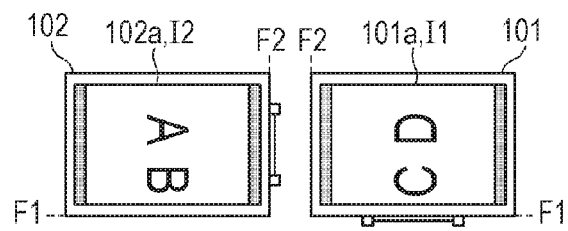
Figure 12F:
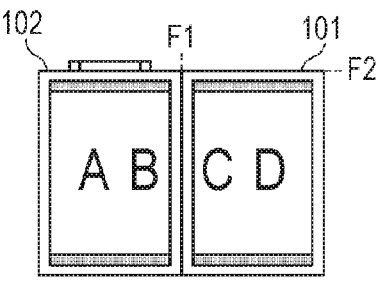

The display control circuit 110 in step S1045 changes (moves) the position for displaying the display image I1 within the display unit 101a to be closer to the plane F1 of the second panel 102 (as illustrated in FIG. 12E). The display controlling method in a case where the display apparatus 100 has the vertically unfolded state has been described above. As described above, when the display apparatus 100 has the vertically unfolded state, the display images I1 and I2 are also displayed adjacently to each other (as illustrated in FIG. 12F).

In other words, when the display apparatus 100 has the horizontally unfolded state or the vertically unfolded state, the first display control circuit 110 executes the display control (first display control) for causing the display unit 101a and display unit 102a to display a plurality of display images (divided images) acquired by dividing a single image.

Figure 13A:
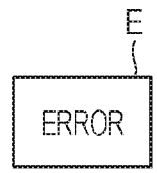
FIGS. 13A to 13E exemplarily illustrate an error display image when the display apparatus according to aspects of the present invention has an error.

Next, with reference to FIGS. 9A to 9D and FIGS. 13A to 13E, a display control to be performed when the display apparatus 100 has an error state or when an error is occurring in the display apparatus 100 will be described. FIGS. 13A to 13E exemplarily illustrate an error display image to be displayed when the display apparatus 100 according to aspects of the present invention has an error state. FIG. 13A exemplarily illustrates an error image E to be displayed by the display apparatus 100. FIG. 13B to FIG. 13E exemplarily illustrate how the error image E is to be displayed on two display units.

As described above, the display apparatus 100 of this exemplary embodiment is configured such that at least one of the sensors 101e and 102e detects magnetic force when the display apparatus 100 has one of the double-sided state, the horizontally unfolded state, and the vertically unfolded state. In this case, in the display apparatus 100 of this exemplary embodiment, the locking between the hinge 103 and the panels in those states is maintained by absorption power of the magnet. Thus, the first panel 101 or second panel 102 may be rotated by force against the absorption power about the axis A1 (axis B1) or the axis A2 (axis B2) so that the display apparatus 100 can change its state to a state in which the panels are not adjacent to each other. In this state, the sensors 101e and 102e may not detect magnetic force, the detected magnetic force may be lower than a predetermined value.

This state occurs when the display units are spaced apart unnaturally. Accordingly, the display apparatus 100 of this exemplary embodiment causes the display units 101a and 102a to display the error image E when both of the sensors 101e and 102e cannot detect magnetic force. With the configuration, a user can be informed of that the display apparatus 100 has an unnatural state. Details thereof will be described.

In step S105 which is described above, a display control to be performed in a case where the display apparatus 100 has an error state starts. The display control circuit 110 in step S1051 changes the original image I which is planned to display to the error image E (as illustrated in FIG. 13A).

Figure 13B:
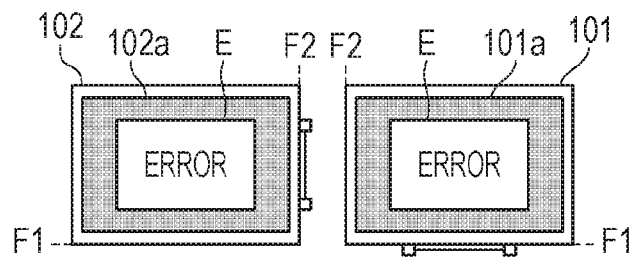

Next, the display control circuit 110 in step S1052 determines the error image E as the display image to be displayed on the display unit 101a and the display unit 102a (as illustrated in FIG. 13B).

Figure 13C:
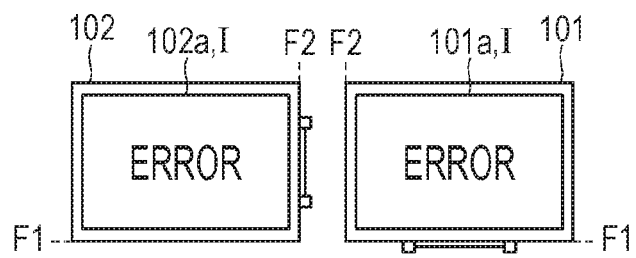
Figure 13D:
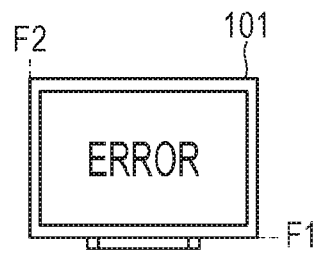
Figure 13E:
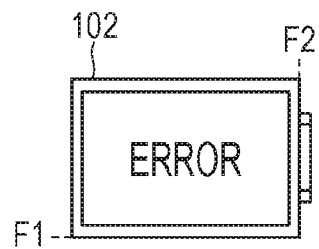

Next, the display control circuit 110 in step S1053 enlarges or reduces the size of the display image (error image E) determined to be displayed on the display unit 101a in step S1052 to a maximum size displayable on the display unit 101a. The display control circuit 120 also enlarges or reduces the size of the determined display image (error image E) to a maximum size displayable on the display unit 102a (as illustrated in FIG. 13C). The display controlling method in a case where the display apparatus 100 has an error state has been described above.

Having described that according to this exemplary embodiment, it is configured that an error image E is displayed on the display units when the display apparatus 100 has an error state, an embodiment of aspects of the present invention is not limited thereto. For example, when the display apparatus 100 has an error state, the original image I may be displayed on the display units, or nothing may be displayed thereon.

As described above, the display apparatus 100 of this exemplary embodiment changes the orientations, sizes, and positions of images to be displayed on the display units 101a and 102a in accordance with the detected states from the sensors 101e and 102e. With this configuration, the display apparatus 100 of this exemplary embodiment can display images having the orientations, sizes, and positions suitable for the state that the display apparatus 100 currently has. Thus, even when the display apparatus 100 is changeable to a plurality of states (or can be unfolded in a plurality of directions), display images can be displayed on the display units without giving strangeness to a user.

It should be noted that the processes illustrated in FIG. 8 and FIGS. 9A to 9D may be implemented by computer programs corresponding to the processes prestored in a first memory included in the first display control circuit 110 by a CPU included in the first display control circuit 110. The first memory may be a flash memory or hard disk including a RAM are and a ROM area.

An aspect ratio of an original image and a relationship between display images (divided images) will be described below with reference to FIGS. 14A to 14F. The following description assumes that the frame width d of the first panel 101 and second panel 102 is approximate to 0 in consideration of the fact that the frame width d is sufficiently small with respect to the display units.

Figure 14A:
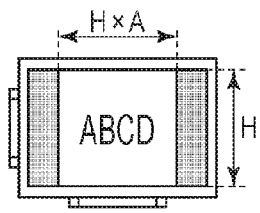
FIGS. 14A to 14F exemplarily illustrate sizes of a display image in accordance with the ratio of an original image thereof according to aspects of the present invention.
Figure 14B:
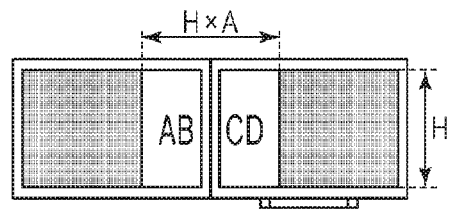
Figure 14C:
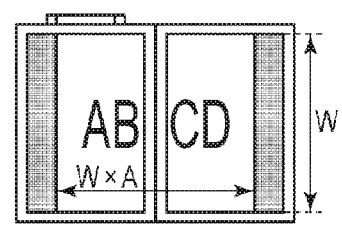
Figure 14D:
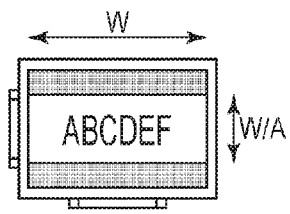
Figure 14E:
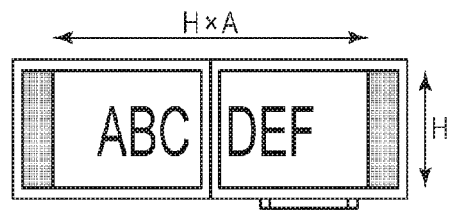
Figure 14F:
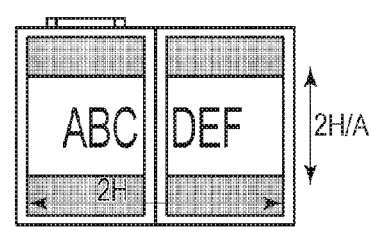

FIGS. 14A to 14F exemplarily illustrate sizes of a display image in accordance with the ratio of the original image according to aspects of the present invention. FIGS. 14A to 14C exemplarily illustrate display images to be displayed on the display apparatus 100 when the ratio in length of the longer side to the shorter side of the original image I is 1:1 (aspect ratio A=1). FIGS. 14D to 14F exemplarily illustrate display images to be displayed on the display apparatus 100 when the ratio in length of the longer side to the shorter side of the original image I is 2.5:1 (aspect ratio A=2.5).

As illustrated in FIGS. 14A and 14B, when images whose original image has an aspect ratio A=1 are displayed on the display apparatus 100 having the double-sided state or the horizontally unfolded state, the height of the display images is limited by the length H of the shorter sides of the display units 101a and 102a. Thus, the size of the display images may be a height of H and a width of H×A=H.

As illustrated in FIG. 14C, when images whose original image has an aspect ratio A=1 is displayed on the display apparatus 100 having the vertically unfolded state, the height of the display images is limited by the length W of the longer sides of the display units 101a and 102a. Thus, the size of the display images in this case are a height of W and a width of W x A=H.

Because the ratio of the dimensions of each of the display units is H:W=2:3, the size of the display images can be enlarged for display on the display apparatus 100 having the vertically unfolded state, compared with display on the display apparatus 100 having the double-sided state, when the original image has the aspect ratio A=1.

Next, as illustrated in FIG. 14D, when an image whose original image has an aspect ratio A=2.5 is displayed on the display apparatus 100 having the double-sided state, the width of the display image is limited by the length W of the longer sides of the display units 101a and 102a. Thus, the size of the display image in this case is a height of W/A (height of W/2.5) and a width of W.

As illustrated in FIG. 14E, when an image whose original image has an aspect ratio A=2.5 is displayed on the display apparatus 100 having the horizontally unfolded state, the height of the display image is limited by the length H of the shorter sides of the display units 101a and 102a. Thus, the size of the display image in this case is a height of H and a width of H×A (width of 2.5H).

As illustrated in FIG. 14F, when an image whose original image has an aspect ratio A=2.5 is displayed on the display apparatus 100 having the vertically unfolded state, the width of the display image is limited by the length 2H of the longer sides of a virtual display screen Sv. Thus, the size of the display image in this case is a height of 2H/A (height of 0.8H) and a width of 2H.

Because the ratio of the dimensions of each of the display units is H:W=2:3, the size of the display images can be enlarged for display on the display apparatus 100 having the horizontally unfolded state or the vertically unfolded state, compared with display on the display apparatus 100 having the double-sided state, when the original image has the aspect ratio A=2.5.

As described above, when the display apparatus 100 of this exemplary embodiment is used to display an image, the displayable image size for each state of the display apparatus 100 varies in accordance with the aspect ratio of the original image. For example, when the aspect ratio of an original image is relatively small and when the display apparatus 100 has the vertically unfolded state, the size of a display image may be enlarged (compared with that for the horizontally unfolded state) for display. When the aspect ratio of the original image is relatively large and when the display apparatus 100 has the horizontally unfolded state, the size of a display image may be enlarged (compared with that for the vertically unfolded state) for display. Thus, in order to display divided images of a single image on the display apparatus 100 of this exemplary embodiment, the state of the display apparatus 100 may be changed in accordance with the aspect ratio of the single image to enlarge the size of the display images for display.

Second Exemplary Embodiment

A display apparatus 200 which is a display apparatus according to a second exemplary embodiment will be described with reference to FIGS. 15A to 17B. Like numbers refer like parts throughout in the first and second exemplary embodiments, and repetitive descriptions will be omitted. Differences from the first exemplary embodiment will be described below.

FIGS. 15A and 15B illustrate a configuration of the display apparatus 200 which is a second exemplary embodiment of the display apparatus embodying aspects of the present invention in the horizontally unfolded state. FIG. 15A is a front view of the display apparatus 200 (from the plane Fa side). FIG. 15B illustrates three views about the display apparatus 200 viewed from the back side (from the plane Fb side). As illustrated in FIGS. 15A and 15B, the display apparatus 200 of this exemplary embodiment is different from the display apparatus 100 of the first exemplary embodiment in that a hinge (second connection member) 104 is further provided and that the magnets 101d and 102d are excluded from the configuration. Components of the display apparatus 200 will be described in detail below.

The first holding unit including the axial supporting portions 101b1 and 101b2 and the axis 101c is provided on the plane Fb of the first panel 101 and within a region close to a plane F4 defined when the longer side of the first panel 101 is equally divided into two. It should be noted that the center of the axis 101c in the X direction positions at 3Hp/4 from the plane F2.

The second holding unit including the axial supporting portions 102b1 and 102b2 and axis 102c is provided on the plane Fb of the second panel 102 and within a region close to a plane F3 defined when the shorter side of the second panel 102 is equally divided into two. It should be noted that the center of the axis 102c in the Y direction positions at 3Wp/4 from the plane F1.

Axial supporting portions 101f1 and 101f2 are supporting units configured to support an axis 101g, which will be described below and are provided on the plane Fb of the first panel 101. The axis 101g is a cylindrical axis having both ends fixed to the axial supporting portions 101f1 and the axial supporting portion 101f2. The axial supporting portions 101f1 and 101f2 and the axis 101g will collectively be called a third holding unit. The third holding unit holds a hinge end portion (fourth end portion) 104b of a hinge 104, which will be described below.

The third holding unit (axial supporting portions 101f1 and 101f2 and axis 101g) is provided at an edge of the shorter side (second side) of the plane Fb. In this case, a central axis (fourth axis) C2 of the axis 101g is located at a position away from the plane Fb by a distance t in the opposite direction (Z direction) of the plane Fa on the plane including the plane F2. The axis C2 and the axis A1 are provided on the same plane. The axis A1 is substantially in parallel with the plane F1, and the axis C2 is substantially in parallel with the plane F2. In the first panel 101, because the plane F1 and the plane F2 are orthogonal to each other, the axis C2 and the axis A1 are also orthogonal to each other.

The axial supporting portions 101f1 and 101f2 are separated by a distance L1 in the direction (Y direction) parallel to the shorter sides of the first panel 101. The axial supporting portions 101f1 and 101f2 are fixed to the plane Fb of the first panel 101 such that the center of the distance L1 can be substantially matched with the position at Hp/4 from the plane F1. Contrary to the second holding unit, the third holding unit is provided on the plane Fb of the first panel 101 and within a region close to the plane F4 defined when the shorter side of the first panel 101 is equally divided into two. The center of the axis 101g in the Y direction positions at Hp/4 from the plane F1.

Axial supporting portions 102f1 and 102f2 are supporting units configured to support an axis 102g, which will be described below, and are provided on the plane Fb of the second panel 102. The axis 102g is a cylindrical axis having both ends fixed to the axial supporting portions 102f1 and the axial supporting portion 102f2. The axial supporting portions 102f1 and 102f2 and the axis 102g will collectively be called a fourth holding unit. The fourth holding unit holds a hinge end portion (third end portion) 104a of a hinge 104, which will be described below.

The fourth holding unit (axial supporting portions 102f1 and 102f2 and the axis 102g) is provided at an edge of the longer side (third side) of the plane Fb. In this case, a central axis (third axis) C1 of the axis 102g is located at a position away from the plane Fb by a distance t in the opposite direction (Z direction) of the plane Fa on the plane including the plane F1. The axis C1 and the axis A2 are provided on the same plane. The axis A2 is substantially in parallel with the plane F2, and the axis C1 is substantially in parallel with the plane F1. In the second panel 102, because the plane F1 and the plane F2 are orthogonal to each other, the axis C1 and the axis A2 are also orthogonal to each other.

The axial supporting portions 102f1 and 102f2 are separated by a distance L1 in the direction (X direction) parallel to the longer sides of the second panel 102 on the plane Fb. The axial supporting portions 102f1 and 102f2 are fixed to the plane Fb of the second panel 102 such that the center of the distance L1 can be substantially matched with the position at Wp/4 from the plane F2. Contrary to the first holding unit, the fourth holding unit is provided on the plane Fb of the second panel 102 and within a region close to the plane F2 defined when the longer side of the second panel 102 is equally divided into two. The center of the axis 102g in the X direction positions at Wp/4 from the plane F2.

A two-axis hinge (hereinafter, simply called a hinge) 104 is a planar second connection member made of a magnetic metallic material. The hinge end portion 104a is a third end portion having a cylindrical shape about the rotating shaft (third axis) D1 and being held by the fourth holding unit of the end portions of the hinge 104. The hinge end portion 104b is a fourth end portion having a cylindrical shape about the rotating shaft (fourth axis) D2 and being held by the third holding unit of the end portions of the hinge 104. Because the configurations of the hinge end portions 104a and 104b are substantially the same as those of the hinge end portions 103a and 103b of the hinge 103, detail description will be omitted.

A connection part 104c is a member made of a magnetic metallic material and functions as a second connection region of the hinge 104 by which the first panel 101 and the second panel 102 can relatively rotate.

The distance from a midpoint of the hinge end portion 104a in the direction parallel to the axis D1 to the axis D2 is equal to a dimension of ¼ (Wp/4) of the length Wp of the longer sides of the first panel 101 and the second panel 102. The distance from the midpoint of the hinge end portion 104b in the direction parallel to the axis D2 to the axis D1 is equal to a dimension of ¼ (Hp/4) of the length Hp of the shorter sides of the first panel 101 and the second panel 102.

In the hinge 104, the hinge end portion 104a and the axis 102g held within the hinge end portion 104a slide to rotate relatively to each other, like the hinge 103. Thus, the hinge 104 is held rotatably about the rotating shaft D1 (substantially matched with the central axis C1 of the axis 102g in the state) with respect to the second panel 102. The hinge end portion 104b and the axis 101g also slide to rotate relatively to each other. Thus, the hinge 104 is held rotatably about the rotating shaft D2 (substantially matched with the central axis C2 of the axis 101g in the state) with respect to the first panel 101.

As described above, in the display apparatus 200 of this exemplary embodiment, the hinge 103 as well as the two end portions of the hinge 104 are held rotatably by the third holding unit provided on the first panel 101 and the fourth holding unit provided on the second panel 102. In the display apparatus 200 with this configuration, the first panel 101 and the second panel 102 can rotate relatively, and the relative positions of the first panel 101 and the second panel 102 can be changed. The display apparatus 200 of this exemplary embodiment can be change to the same states (horizontally unfolded state, double-sided state, vertically unfolded state) as those of the display apparatus 100 of the first exemplary embodiment.

As illustrated in FIGS. 15A and 15B, when the display apparatus 200 has the horizontally unfolded state, the connection part 103c of the hinge 103 is superimposed on the first panel 101 in the display direction (thickness direction of the display apparatus 200 (Z direction)) of the display units 101a and 102a. When the display apparatus 200 has the horizontally unfolded state, the connection part 104c of the hinge 104 is superimposed on the second panel 102 in the thickness direction of the display apparatus 200.

FIGS. 16A and 16B illustrate a configuration of the display apparatus 200 which is the second exemplary embodiment of the display apparatus embodying aspects of the present invention having the double-sided state. FIG. 16A illustrates the display apparatus 200 viewed from the front side (the plane Fa having the first panel 101). FIG. 16B illustrates three views about the display apparatus 200 viewed from the back side (the plane Fa of the second panel 102).

The display apparatus 200 of this exemplary embodiment may have a state acquired by rotating the first panel 101 and the second panel 102 relatively substantially 180 degrees about the axis A2 (axis B2) and axis C2 (axis D2) from the horizontally unfolded state. In this state, the connection part 104c of the hinge 104 is superimposed on both of the first panel 101 and the second panel 102 in the thickness direction of the display apparatus 200.

Figure 17B:
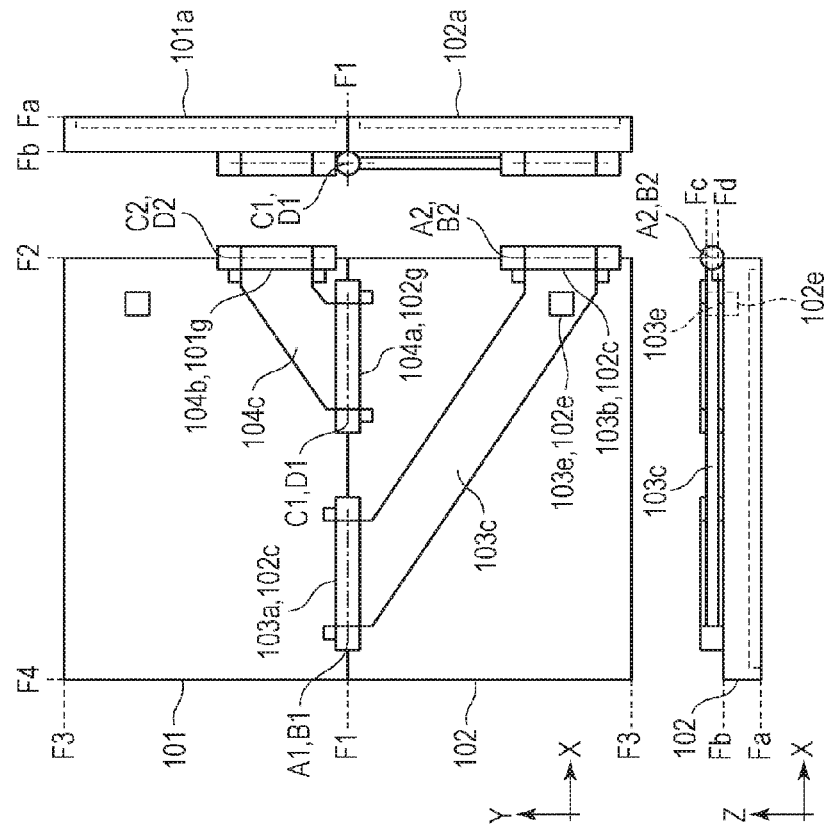
FIGS. 17A and 17B illustrate a configuration of the display apparatus which is the second exemplary embodiment of the display apparatus in a case where it is vertically unfolded (second state).
Figure 17A:
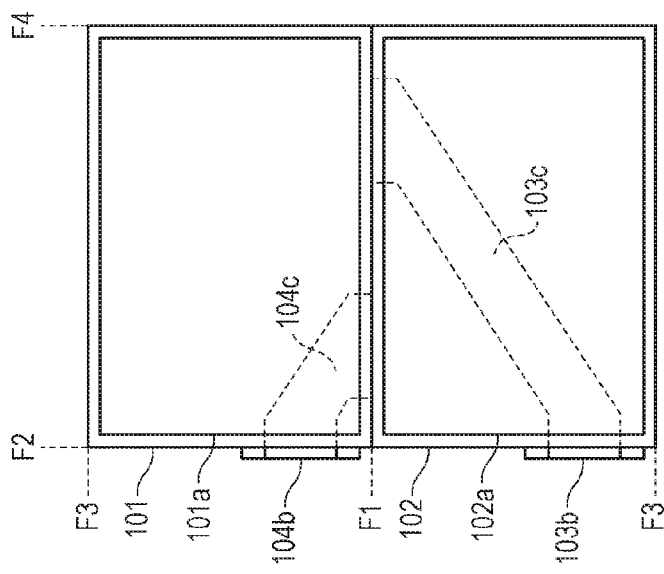

FIGS. 17A and 17B illustrate a configuration of the display apparatus 200 which is the second exemplary embodiment of the display apparatus embodying aspects of the present invention having the vertically unfolded state. FIG. 17A is a front view of the display apparatus 200 (from the plane Fa side). FIG. 17B illustrates three views about the display apparatus 200 viewed from the back side (the plane Fb side).

The display apparatus 200 of this exemplary embodiment may have a state acquired by rotating the first panel 101 and the second panel 102 relatively substantially 180 degrees about the axis A1 (axis B1) and axis C1 (axis D1) from the double-sided state. In this state, the connection part 104c of the hinge 104 is superimposed on the first panel 101 in the thickness direction of the display apparatus 200.

As described above, the display apparatus 200 of this exemplary embodiment can change its state to three states of the horizontally unfolded state, the double-sided state, and the vertically unfolded state. Thus, the display apparatus 200 of this exemplary embodiment can be unfolded by moving the first panel 101 and the second panel 102 each having a display unit in a plurality of directions.

The connection part 103c of the hinge 103 of this exemplary embodiment and the connection part 104c of the hinge 104 are superimposed on different panels from each other in the thickness direction of the display apparatus 200 in accordance with the unfolded state of the display apparatus 200. The panels on which connection part 103c of the hinge 103 and the connection part 104c of the hinge 104 are superimposed change in the thickness direction of the display apparatus 200 in accordance with the state of the display apparatus 200.

For example, when the display apparatus 200 has the horizontally unfolded state, the connection part 103c and the connection part 104c are superimposed on the first panel 101 and the second panel 102, respectively, in the thickness direction (Z direction) of the display apparatus 200. On the other hand, when the display apparatus 200 has the vertically unfolded state, the connection part 103c and the connection part 104c are superimposed on the second panel 102 and the first panel 101, respectively, in the thickness direction (Z direction) of the display apparatus 200. In other words, in the display apparatus 200 of this exemplary embodiment having any of the unfolded states, the back sides (plane Fb side) of both of the first panel 101 and second panel 102 are supported by the hinge 103 or hinge 104.

This configuration can improve the rigidity of the display apparatus 200 of this exemplary embodiment against external force. This configuration can prevent the display apparatus 200 from being moved in a direction not intended by a user while its state is changing (such as during a change from the horizontally unfolded state to the double-sided state). In other words, the display apparatus 200 can change its state easily without the magnets 101d and 102d.

According to this exemplary embodiment, the magnet 103e is provided in the hinge 103. However, an embodiment of aspects of the present invention is not limited thereto. For example, a detection magnet having substantially the same configuration as that of the magnet 103e may be provided in the connection part 104c of the hinge 104. In this case, the display control circuits 110 and 120 may be configured to detect the state of the display apparatus 200 based on the detected state of the detection magnet provided in the connection part 104c.

Having described that according to this exemplary embodiment a magnet for locking the hinge 103 is not provided on the panels, an embodiment of aspects of the present invention is not limited thereto. For example, like the first exemplary embodiment, the magnets 101d and 102d may be provided, or substantially the same magnet as the magnets 101*d* and 102*d* may be provided at a position on the first panel 101 and the second panel 102 on which the hinge 104 can be superimposed. In other words, a locking unit for locking the hinge 104 may be provided on the first panel 101 and the second panel 102.

Having described the exemplary embodiments of aspects of the present invention, aspects of the present invention are not limited thereto, and various changes and modifications may be made thereto without departing from the spirit and scope. For example, having described that according to the aforementioned exemplary embodiments, divided images (display images) of an original image are displayed separately on the first display unit and the second display unit in accordance with the unfolded state of the display apparatus, aspects of the present invention are not limited thereto. For example, an original image may be displayed only on one of the first display unit and the second display unit without dividing.

In this case, an image other than the original image may be displayed on the display unit which is not displaying the original image. For example, information regarding the image being displayed on one display unit or an image acquired subsequent in time to the image being displayed on the one display unit may be displayed on the other display unit.

Having described that according to the aforementioned exemplary embodiments, the display apparatus having two panels (first panel 101 and second panel 102) whose positions can be changed to a plurality of states, the relative positions of two or more panels may be changed.

Having described that a magnet (or one using magnetic force) is used as a locking unit according to the aforementioned exemplary embodiment, aspects of the present invention are not limited thereto. For example, a hook or a pin may be used to mechanically lock the hinge 103. A lock mechanism for locking the state of the display apparatus may further be provided.

Furthermore, the dimensions of the internal circumferences of the hinge end portions 103*a*, 103*b*, 104*a*, and 104*b* or the outer circumferences of the axes 101*c*, 102*c*, 101*g*, and 102*g* may be adjusted to achieve larger frictional force caused by sliding of the hinge end portions and the axes than the weights of the panels. This configuration can maintain the state of the display apparatus without a locking unit on the display apparatus.

According to the aforementioned exemplary embodiments, magnetic sensors such as the sensors 101*e* and 102*e* are used as a detection unit configured to detect the state of the display apparatus. However, aspects of the invention are not limited thereto. For example, as the detection unit, other types of sensor such as a light detection sensor may be used, or a mechanical switch may be used.

According to the aforementioned exemplary embodiments, positional relationship between the panels and the hinge is detected for detecting the state of the display apparatus. However, aspects of the present invention are not limited thereto. For example, the relative positions of the first panel 101 and the second panel 102 may be directly detected to detect the state of the display apparatus.

More specifically, detection units may be provided on the planes F1 and planes F2 of the first panel 101 and the second panel 102. In this configuration, when the display apparatus has the horizontally unfolded state, it is detected that the planes F2 of the panels face each other. When the display apparatus has the vertically unfolded state, it is detected that the planes F1 of the panel face each other.

When it is detected that the planes F2 face each other, the display control circuit 110 (or the display control circuit 120) determines that the display apparatus has the horizontally unfolded state. When it is detected that the planes F1 face each other, the display control circuit 110 (or the display control circuit 120) determines that the display apparatus has the vertically unfolded state. When it is not detected that the planes F1 and the planes F2 face each other, the display control circuit 110 determines that the display apparatus has the double-sided state.

The sizes of the first panel 101 and the second panel 102 may be different, or the sizes of the display unit 101*a* and the display unit 102*a* may be different.

Having described that the first holding unit and the second holding unit are provided on the planes Fb of the first panel 101 and the second panel 102 according to the aforementioned exemplary embodiments, aspects of the present invention are not limited thereto. For example, they may be provided on side faces of the first panel 101 and the second panel 102. Details thereof will be described below with reference to FIGS. 18A to 18C and 19A and 19B.

Figure 18A:
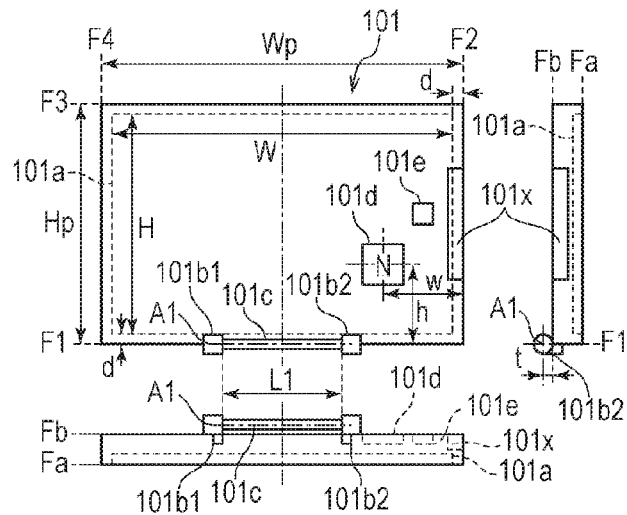
FIGS. 18A to 18C illustrate components of a display apparatus which is a variation example of the display apparatus.
Figure 18B:
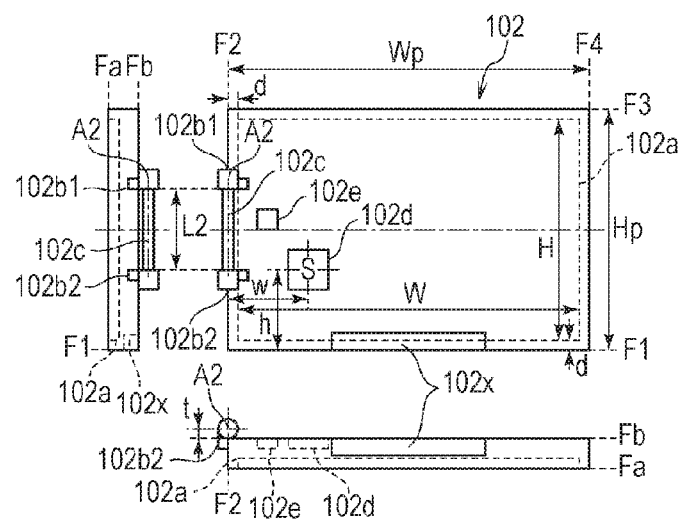
Figure 18C:
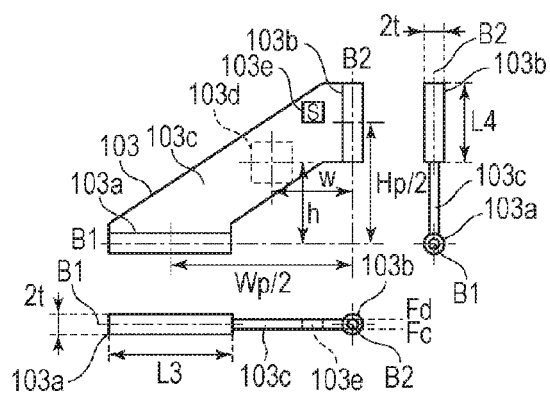

FIGS. 18A to 18C illustrate components of a display apparatus 300 which is a variation example of the display apparatus embodying aspects of the present invention. FIGS. 18A to 18C illustrate three views of the first panel 101, the second panel 102, and the two-axis hinge 103.

Figure 19A:
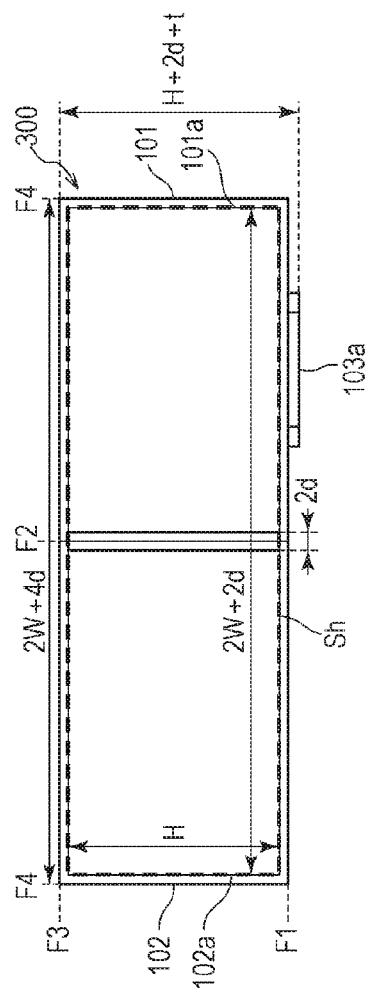
FIGS. 19A and 19B illustrate a configuration of the display apparatus according to the variation example of aspects of the present invention in a case where it is horizontally unfolded (first state).
Figure 19B:
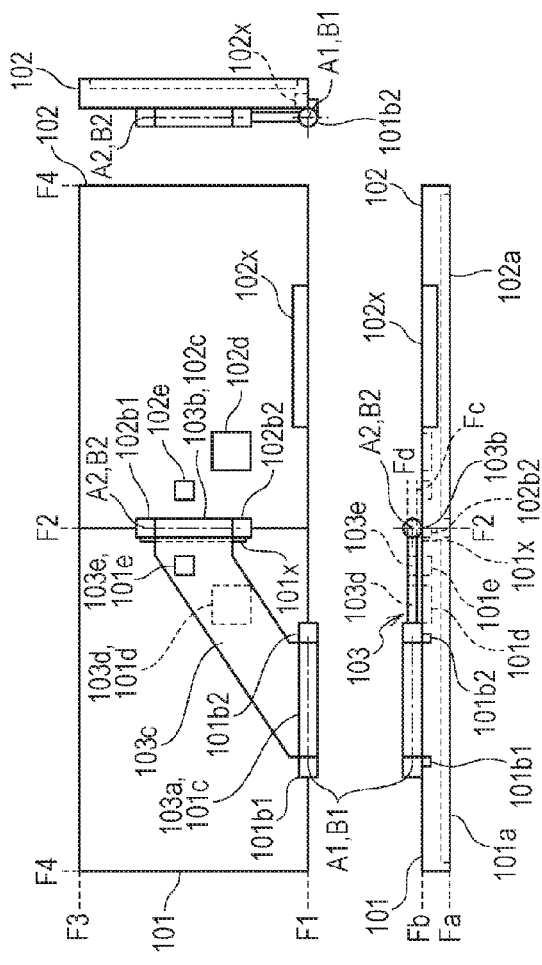

FIGS. 19A and 19B illustrate a configuration of the display apparatus 300 having the horizontally unfolded state. FIG. 19A illustrates the display apparatus 300 viewed from the front side (the plane having the display units 101*a* and 102*a*). FIG. 19B illustrates three views about the display apparatus 300 viewed from the back side (the opposite side having the display units 101*a* and 102*a*). Like numbers refer to like parts throughout in the display apparatus 100 of the first exemplary embodiment and the display apparatus 300 of this variation example. Differences in configuration between the display apparatus 300 and the display apparatus 100 according to the first exemplary embodiment will be described below.

As illustrated in FIGS. 18A to 18C, the display apparatus 300 of this variation example has axial supporting portions 101*b*1 and 101*b*2 having a section extending to the plane F1 of the first panel 101. In other words, the axial supporting portions 101*b*1 and 101*b*2 are provided across the plane Fb and plane F1 of the first panel 101. The display apparatus 300 of this variation example has axial supporting portions 102*b*1 and 102*b*2 having a section extending to the plane F2 of the second panel 102. In other words, the axial supporting portions 102*b*1 and 102*b*2 are provided across the plane Fb and the plane F2 of the second panel 102.

As illustrated in FIGS. 18A to 18C, the display apparatus 300 of this variation example has a notch 101*x* in the plane F2 of the first panel 101. The display apparatus 300 of this variation example further has a notch 102*x* in the plane F1 of the second panel 102.

As illustrated in FIGS. 19A and 19B, when the display apparatus 300 is unfolded, the axial supporting portions 102*b*1 and 102*b*2 extending to the plane F2 of the second panel 102 are stored in the notch 101*x* of the first panel 101. In other words, when the display apparatus 300 is changed to the horizontally unfolded state, the extensions of the axial supporting portions 101*b*1 and 101*b*2 are stored within the notch 101*x*. Thus, the axial supporting portions 101*b*1 and 101*b*2 can be prevented from interfering with the relative rotations of the first panel 101 and the second panel 102.

Also, when the display apparatus 300 is changed to the vertically unfolded state, the axial supporting portions 101b1 and 101b2 extending to the plane F1 of the first panel 101 are stored within the notch 102x of the second panel 102. Thus, the axial supporting portions 102b1 and 102b2 can be prevented from interfering with the relative rotations of the first panel 101 and the second panel 102. When the display apparatus 300 has the double-sided state, the axial supporting portions do not interfere with the relative rotations of the panels.

As described above, also in the display apparatus 300 having the axial supporting portions extending to the plane F1 and plane F2, the relative positions of the first panel 101 and the second panel 102 can be changed to a plurality of states. In other words, also in the display apparatus 300 having the first holding unit and the second holding unit provided on the side faces of the corresponding panels, the relative positions of the panels can be changed to acquire the horizontally unfolded state, the double-sided state, and the vertically unfolded state.

The display apparatus according to any of the aforementioned exemplary embodiments is applicable as a display unit in an electronic apparatus such as an imaging apparatus. Details thereof will be described below with reference to FIGS. 20A and 20B.

FIGS. 20A and 20B exemplarily illustrate a display apparatus 500, which is a variation example of the display apparatus implementing aspects of the present invention, applied to an imaging apparatus 400. FIG. 20A is a top view of the imaging apparatus 400 (with the display apparatus 500), and FIG. 20B is a back view thereof.

Like numbers refer to like parts throughout in the display apparatus 100 of the first exemplary embodiment and the display apparatus 500. Exemplarily in FIG. 20A, the display apparatus 500 having the horizontally unfolded state is indicated by a solid line, and the display apparatus 500 having the double-sided state is indicated by a chain double-dashed line. Exemplarily in FIG. 20B, the display apparatus 500 having the horizontally unfolded state is indicated by a solid line, and the display apparatus 500 having the vertically unfolded state is indicated by a chain double-dashed line.

In the Z direction illustrated in FIG. 20A, assume that the side on which a lens 401a of an imaging unit 401 is provided is a front side of the imaging apparatus 400 and that the opposite side is a back side thereof. In the X direction illustrated in FIG. 20A, assume that the side on which the first panel 101 positions is the right-hand side of the imaging apparatus 400 and that the opposite side thereof is the left-hand side of the imaging apparatus 400, where the display apparatus 500 included in the imaging apparatus 400 has the horizontally unfolded state. In the Y direction illustrated in FIG. 20B, assume that the side on which the lens 401a of the imaging unit 401 is provided is an upper side of the imaging apparatus 400 and that the opposite side thereof is a lower side.

When the display apparatus 500 included in the imaging apparatus 400 has the horizontally unfolded state or the vertically unfolded state, the imaging apparatus 400 has the display unit 101a and the display unit 102a face toward substantially the same direction to the back side. When the display apparatus 500 has the double-sided state, the imaging apparatus 400 has the display unit 101a facing to the front side and the display unit 102a facing to the back side.

As illustrated in FIGS. 20A and 20B, the imaging apparatus 400 includes the display apparatus 500 and the imaging unit 401. The imaging unit 401 is held on the plane F4 of the second panel 102 in the display apparatus 500. The imaging unit 401 includes a lens 401a configured to guide an optical image of a photographic subject to an image sensor, not illustrated.

The imaging unit 401 includes a microcomputer (CPU) and a memory, not illustrated, and the CPU controls various operations and processes including capturing an image of a photographic subject and developing image data acquired by imaging.

More specifically, image data acquired by the imaging unit 401 is converted to image data for display (display image) by the CPU. Information regarding the converted display image is transmitted from a camera communicating unit, not illustrated, to the display control circuit 110 through the first communicating unit 112 provided in the first panel 101. The subsequent processes are performed in the same manner as in the display apparatus 100 of the first exemplary embodiment (see flowcharts in FIGS. 8 and 9A to 9D).

It should be noted that the imaging apparatus 400 of this variation example may not include the display control circuits 110 and 120, unlike the first exemplary embodiment. In this case, the controls to be executed by the display control circuits 110 and 120 may be executed by the CPU instead. Instructions from the CPU to the first panel 101 and second panel 102 are executed through a communicating unit provided in the imaging apparatus 400 and through the first communicating unit 112 and second communicating unit 122.

The imaging apparatus 400 of this variation example having the configuration as described above can display an image captured by imaging a photographic subject by a user positioned on the back side of the imaging apparatus 400, for example, in an enlarged size on two display units. An image captured by the imaging may be displayed on one display unit, and various parameters regarding the captured image of the photographic subject, for example, may be displayed on the other display unit.

For example, when a user on the front side of the imaging apparatus 400 images a photographic subject, the user can also check on the display unit 101a the framing and a time period until capturing a photographic subject by using a so-called self-timer.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-045141, filed Mar. 6, 2015, which is hereby incorporated by reference herein in its entirety.

What is claimed is:

1. A display apparatus comprising:
a first panel having a display unit on a first plane having a first side and a second side orthogonal to the first side;
a second panel having a display unit on a second plane having a third side and a fourth side orthogonal to the third side;
a connection member configured to connect the first panel and the second panel;
a first holding unit configured to hold a first end portion of the connection member at a position adjacent to the first side the first panel;
a second holding unit configured to hold a second end portion of the connection member at a position adjacent to the fourth side of the second panel; and a connection region between the first end portion and the second end portion in the connection member, wherein relative positions of the first panel and the second panel are changed such that the display apparatus has a first state in which the first plane and the second plane face toward a same direction and the first side and the third side are adjacent to each other, a second state in which the first plane and the second plane face toward a same direction and the second side and the fourth side are adjacent to each other, and a third state in which a back side of the first plane and a back side of the second plane face each other, wherein the first end portion is held by the first holding unit so as to be rotatable about a first axis substantially in parallel with the first side, wherein the second end portion is held by the second holding unit so as to be rotatable about a second axis substantially in parallel with the fourth side and orthogonal to the first axis, and wherein the connection region is superimposed on a different one of the panels in the first state and the second state of the display apparatus when the display apparatus is viewed from the first plane side and the second plane side.

2. The display apparatus according to claim 1,
wherein the connection region is superimposed on both of the first panel and the second panel in the display apparatus having the third state when the display apparatus is viewed from the first plane side and the second plane side.

3. The display apparatus according to claim 1,
wherein the connection region is superimposed on the first panel in the display apparatus having the first state and is superimposed on the second panel in the display apparatus having the second state when the display apparatus is viewed from the first plane side and the second plane side.

4. The display apparatus according to claim 1,
wherein the display apparatus in the first state has the third side of the second panel on an extension of the first side of the first panel, and the display apparatus in the second state has the fourth side of the second panel on an extension of the second side of the first panel.

5. The display apparatus according to claim 1,
wherein the first side is a longer side of the first plane;
wherein the second side is a shorter side of the first plane;
wherein the third side is a longer side of the second plane, and
wherein the fourth side is a shorter side of the second plane.

6. The display apparatus according to claim 1,
wherein the connection region of the connection member is planar.

7. The display apparatus according to claim 1, further comprising:
a first locking unit provided on the back side of the first plane of the first panel; and
a second locking unit provided on the back side of the second plane of the second panel; and
wherein the connection member is locked by the first locking unit when the display apparatus has the first state and is locked by the second locking unit when the display apparatus has the second state.

8. The display apparatus according to claim 1, further comprising:

a display control unit configured to control display of an image on display units of the first panel and the second panel, wherein the display control unit is capable of executing a first display control for displaying a plurality of divided images of a single image on the display units of the first panel and the second panel and a second display control for displaying the single image on the display units of the first panel and the second panel.

9. The display apparatus according to claim 8,
wherein the display control unit executes the first display control such that the plurality of divided images can have different sizes between the first state and the second state of the display apparatus.

10. The display apparatus according to claim 9,
wherein the display control unit executes the first display control such that the plurality of divided images can have different sizes in accordance with the aspect ratio of the single image.

11. The display apparatus according to claim 8, further comprising:
a detection unit configured to detect a state of the display apparatus,
wherein the display control unit executes the first display control in a case where the detection unit detects that the display apparatus has the first state or the second state and executes the second display control in a case where the detection unit detects that the display apparatus has the third state.

12. The display apparatus according to claim 11,
wherein the detection unit is configured to detect a panel superimposed on the connection region to detect a state of the display apparatus; and
wherein the display control unit executes the first display control such that the plurality of divided images can have different sizes based on a detection result from the detection unit.

13. The display apparatus according to claim 1, further comprising:
a second connection member configured to connect the first panel and the second panel and having a third end portion, a fourth end portion, and a second connection region which is a region between the third end portion and the fourth end portion;
a third holding unit configured to hold the fourth end portion of the second connection member at a position adjacent to the second side of the first panel;
a fourth holding unit configured to hold the third end portion of the second connection member at a position adjacent to the third side of the second panel; and
wherein the connection member is a first connection member;
wherein the connection region of the first connection member is a first connection region;
wherein the third end portion is held by the fourth holding unit so as to be rotatable about a third axis substantially in parallel with the third side of the second panel;
wherein the fourth end portion is held by the fourth holding unit so as to be rotatable about a fourth axis substantially in parallel with the second side of the first panel and orthogonal to the third axis; and
wherein the second connection region is superimposed on a different one of the panels in the first state and the second state of the display apparatus when the display apparatus is viewed from the first plane side and the second plane side.

14. The display apparatus according to claim 13,
wherein the second connection region is superimposed on the second panel in the display apparatus having the first state, is superimposed on the first panel in the display apparatus having the second state, and is superimposed on both of the first panel and the second panel in the display apparatus having the third state when the display apparatus is viewed from the first plane side and the second plane side.

* * * * *